(12) United States Patent
Kobuchi et al.

(10) Patent No.: US 8,034,505 B2
(45) Date of Patent: Oct. 11, 2011

(54) FUEL CELL SEPARATOR THAT IS EXCELLENT IN WORKABILITY AND CORROSION RESISTANCE

(75) Inventors: Yasushi Kobuchi, Yamatokooriyama (JP); Ikuzo Usami, Kanagawa (JP); Toshiaki Kasazaki, Yamatokooriyama (JP); Tomohiro Nishio, Yamatokooriyama (JP)

(73) Assignee: Nitta Corporation, Osaka (JP)

( * ) Notice: Subject to any disclaimer, the term of this patent is extended or adjusted under 35 U.S.C. 154(b) by 1176 days.

(21) Appl. No.: 10/579,067

(22) PCT Filed: Nov. 8, 2004

(86) PCT No.: PCT/JP2004/016521
§ 371 (c)(1),
(2), (4) Date: May 22, 2007

(87) PCT Pub. No.: WO2005/045971
PCT Pub. Date: May 19, 2005

(65) Prior Publication Data
US 2008/0026279 A1    Jan. 31, 2008

(30) Foreign Application Priority Data

Nov. 11, 2003   (JP) .................................. 2003-381170
Nov. 11, 2003   (JP) .................................. 2003-381171
Aug. 9, 2004    (JP) .................................. 2004-232588

(51) Int. Cl.
*H01M 8/24* (2006.01)
*H01M 2/14* (2006.01)
*H01M 2/18* (2006.01)
*H01M 8/04* (2006.01)

(52) U.S. Cl. .......................... 429/457; 429/508; 429/514

(58) Field of Classification Search .......... 429/156–157, 429/465, 467–469, 508, 535, 456–460, 512–514; 427/115
See application file for complete search history.

(56) References Cited

U.S. PATENT DOCUMENTS
4,604,331 A   8/1986   Louis
(Continued)

FOREIGN PATENT DOCUMENTS
DE   19961496 A1   7/2000
(Continued)

OTHER PUBLICATIONS

Machine Translation and Abstract in English of JP 2003/8297383.*
(Continued)

*Primary Examiner* — Barbara Gilliam
*Assistant Examiner* — Claire L Roe
(74) *Attorney, Agent, or Firm* — Harness, Dickey & Pierce, P.L.C.

(57) ABSTRACT

A separator that is excellent in workability and corrosion resistance, and allows a reduction in the number of constituent components of a fuel cell and the number of manufacturing process steps, and a manufacturing method therefore are provided. A separator includes a separating section for achieving separation between a hydrogen gas channel and an oxygen gas channel, and a sealing section disposed along an outer periphery of the separator, for preventing leakage of hydrogen and oxygen gases. The separating section and the sealing section are formed integrally with each other by means of plastic deformation processing, e.g., press working, of a metal thin sheet. A coating layer is formed n the metal thin sheet to coat the metal thin sheet's surface, and a DC power generated at an interface between a high polymer membrane and a catalytic electrode on contact of the coating layer with the catalytic electrode is taken out as a DC current and is collected at a power collector plate after passing through an interior of the separator. A high polymer elastic layer is provided at the part contacting the high polymer membrane of a sealing projection of the sealing section. The polymer elastic layer contacts the polymer film to seal.

14 Claims, 21 Drawing Sheets

U.S. PATENT DOCUMENTS

| | | | |
|---|---|---|---|
| 5,232,792 A * | 8/1993 | Reznikov | 429/423 |
| 6,040,076 A * | 3/2000 | Reeder | 429/460 |
| 6,165,634 A * | 12/2000 | Krasij et al. | 429/434 |
| 6,291,094 B1 | 9/2001 | Yoshimura et al. | |
| 6,383,678 B1 | 5/2002 | Kaneko et al. | |
| 2001/0033957 A1 | 10/2001 | Nakata et al. | |
| 2002/0086196 A1 | 7/2002 | Utsunomiya et al. | |
| 2002/0090542 A1 * | 7/2002 | Mosdale et al. | 429/35 |
| 2002/0117780 A1 | 8/2002 | Inoue et al. | |
| 2005/0064267 A1 | 3/2005 | Guttermann et al. | |

FOREIGN PATENT DOCUMENTS

| | | |
|---|---|---|
| EP | 0 405 088 A1 | 1/1991 |
| EP | 0521830 A1 | 1/1993 |
| JP | 61-120977 | 2/1988 |
| JP | 63-28251 | 2/1988 |
| JP | 63-289770 A | 11/1988 |
| JP | 02-168563 | 6/1990 |
| JP | 2-168563 A | 6/1990 |
| JP | 06-163063 | 6/1994 |
| JP | 08-180883 | 7/1996 |
| JP | 09-199141 | 7/1997 |
| JP | 10-92447 A | 4/1998 |
| JP | 2000-133290 A | 5/2000 |
| JP | 2000-138067 A | 5/2000 |
| JP | 2000-243408 A | 9/2000 |
| JP | 2001-307747 A | 11/2001 |
| JP | 2001-351642 A | 12/2001 |
| JP | 2001-357859 A | 12/2001 |
| JP | 2002-175818 | 6/2002 |
| JP | 2002-237317 | 8/2002 |
| JP | 2003-151572 A | 5/2003 |
| JP | 2003-297383 | 10/2003 |
| JP | 20038297383 A * | 10/2003 |
| WO | WO 03/044886 | 5/2003 |

OTHER PUBLICATIONS

ISR Feb. 1, 2005.

Supplemental European Search Report, (Jul. 18, 2008).

* cited by examiner

FUEL CELL SEPARATOR THAT IS EXCELLENT IN WORKABILITY AND CORROSION RESISTANCE

TECHNICAL FIELD

The present invention relates to a separator designed for use in a stack-type solid polymer fuel cell.

BACKGROUND ART

The need for the effective use of limited energy resources, as well as the need for energy saving to prevent global warming, has hitherto become a matter of public awareness. To date energy needs have been served by means of thermal power generation; that is, by converting heat energy into electric energy. However, considering that coal and oil resources required for thermal power generation are limited in recoverable reserves, the demand for an alternative to such resources has augmented as a natural consequence. As one of new energy resources, attention is being given to a fuel cell for effecting chemical power generation with use of hydrogen for fuel.

A typical fuel cell is composed of two electrodes, namely an anode and a cathode, having sandwiched therebetween an electrolyte. In the cathode, supplied hydrogen is ionized to form hydrogen ion which travels through the electrolyte toward the anode. In the anode, supplied oxygen and the hydrogen ion having passed through the electrolyte react with each other to form water. As the electrons generated in accompaniment with the ionization of hydrogen are moved from the cathode to the anode through wiring, electric current is developed, thus generating electricity.

The fuel cells are classified into four types depending upon the kind of electrolyte: a solid oxide type fuel cell (SOFC) using ion conductive ceramics as an electrolyte; a solid polymer electrolyte type fuel cell (PEFC) using a hydrogen-ion conductive polymeric membrane as an electrolyte; a phosphoric acid type fuel cell (PAFC) using phosphoric acid in highly concentrated form as an electrolyte; and a molten carbonate type fuel cell (MCFC) using alkaline metal carbonate as an electrolyte. Recently, there has been brisk development on the solid polymer electrolyte fuel cell (PEFC) in particular because of its relatively low operating temperature (80° C.).

The solid polymer electrolyte fuel cell is mainly composed of an electrolyte layer, a separator, and a power collector plate. The electrolyte layer has a catalytic electrode formed on its surface. On both sides of the electrolyte layer is disposed the separator so as to sandwich the electrolyte layer. The separator is provided with channels for the supply of hydrogen and oxygen. The power collector plate serves to collect electricity generated in the electrode. Not only the electrolyte layer but also the separator has been improved upon on a repeated basis.

The requirements to be fulfilled by the separator include: high electrical conductivity; high hermeticity against fuel gas and oxidizer gas; and high resistance to corrosion by oxidation-reduction reaction products of hydrogen as well as oxygen.

In order to constitute a separator such as that which satisfies the above stated requirements, the following materials have been used. One of the most frequently used materials is fine-grained carbon which is excellent in electrical conductivity, corrosion resistance, and mechanical strength, and is also higher in workability and lighter in weight. However, the fine-grained carbon is susceptible to oscillation and shock and needs to be subjected to cutting process, which leads to an undesirable increase in the processing cost. It is also necessary to perform additional treatment thereon to attain impermeability to gaseous substances.

As synthetic resin materials, heat-hardening resin such as phenol resin and epoxy resin has been in general use. The synthetic resin, although it is advantageous in terms of cost reduction, offers poor dimensional stability and low electrical conductivity.

Metal materials have also been coming into wider use from the standpoints of electrical conductivity, workability, and hermeticity. In general, titanium and stainless are used. However, the negative side is that metal is susceptible to corrosion, and, in a separator made of metal, metal ion tends to be taken in an electrolyte membrane, which results in deterioration in ion conductivity. In order to avoid this, the separator needs to have its surface plated with gold.

The last example is rubber materials. For example, ethylene-propylene-diene rubber is preferably used. Rubber is low in gas permeability but high in sealability.

Japanese Unexamined Patent Publication JP-A 8-180883 (1996) discloses a solid polymer electrolyte fuel cell. This solid polymer electrolyte fuel cell employs, as a separator, a thin sheet made of such a metal material as lends itself to passivation in an atmospheric environment, for example, stainless steel or titanium alloy. The metal thin sheet is processed into a separator of predetermined configuration by means of press working.

Moreover, Japanese Unexamined Patent Publication JP-A 2002-175818 discloses a separator designed for use in a fuel cell. This fuel cell separator has a rib formed at its outer edge to provide high rigidity, whereby the separator can be prevented from being warped when held by a sealing material.

Further, Japanese Unexamined Patent Publication JP-A 2003-297383 also discloses a separator designed for use in a fuel cell. This fuel cell separator is constituted by a metal base sheet which has, on its one surface at least, a first resin layer and a second resin layer formed of an admixture of resin and an electrically conductive filler. The first resin layer exhibits a volume resistivity of 1.0 Ω·cm or below. The second resin layer is smaller in volume resistivity than the first resin layer. In this way, the separator succeeds in providing enhanced power collecting capability, moldability, strength, and corrosion resistance.

The separator constituted by a metal sheet, although it is excellent in workability, is susceptible to corrosion under the influence of oxygen gas. In such a separator, metal ion is taken in an electrolyte membrane, which results in deterioration in ion conductivity. In order to avoid this, the separator needs to have its surface plated with gold.

Moreover, the separator of conventional design has its outer periphery sealed with a sealing material such as an O-ring to prevent leakage of hydrogen gas, oxygen gas, and coolant.

In the conventional constructions disclosed in JP-A 8-180883 (1996) and JP-A 2002-175818, a gasket is disposed in the vicinity of the separator to prevent leakage of reaction gas and coolant fluid.

As described hereinabove, in the conventional fuel cells, there is a need to interpose a sealing material between the outer periphery of the separator and the cell. Furthermore, in terms of manufacturing process steps, after processing the separator into a desired shape, an additional step is required to fix a sealing material to the outer periphery of the separator or to form a sealing material by means of die molding, with the separator placed as a core.

DISCLOSURE OF INVENTION

An object of the invention is to provide a separator that is excellent in workability and corrosion resistance. Another object of the invention is to provide a separator that allows a reduction in the number of constituent components of a fuel cell as well as a reduction in the number of manufacturing process steps.

The invention provides a separator which is interposed between adjacent ones of a plurality of electrolyte assemblies, each constructed of an electrolyte layer containing an electrolyte medium sandwiched between two catalytic electrodes, the catalytic electrodes each being disposed on a surface in a thickness-wise direction of the electrolyte layer, comprising a separating section for achieving separation between a fuel gas channel and an oxidizer gas channel; and a sealing section disposed along an outer periphery of the separator, for preventing leakage of fuel gas and oxidizer gas, the separating section and the sealing section being integrally formed with each other.

wherein a region corresponding to the sealing section is provided with a sealing projection which is formed so as to extend in parallel with the surface of the electrolyte assembly on which the catalytic electrode is formed, a vertex of which is brought into pressure-contact with the electrolyte assembly under a resilient force, and a sectional profile of the sealing projection perpendicular to a direction in which fuel gas and oxidizer gas flow is arc-shaped.

According to the invention, the separator is designed to be interposed between the adjacent ones of a plurality of electrolyte assemblies each constructed of an electrolyte layer containing an electrolyte medium and a catalytic electrode disposed on a surface in a thickness-wise direction of the electrolyte layer. The separator is composed of: a separating section for achieving separation between a fuel gas channel and an oxidizer gas channel; and a sealing section disposed along the outer periphery of the separator, for preventing leakage of fuel gas and oxidizer gas.

A region corresponding to the sealing section is provided with a sealing projection which is formed so as to extend in parallel with the surface of the electrolyte assembly on which the catalytic electrode is formed, a vertex of which is brought into pressure-contact with the electrolyte assembly under a resilient force, and a sectional profile of the sealing projection perpendicular to a direction in which fuel gas and oxidizer gas flow is arc-shaped.

This makes it possible to eliminate the need to prepare a sealing member such as an O-ring or a gasket that has conventionally been required to effect sealing, and thereby reduce the number of the constituent components of a fuel cell and also reduce the number of manufacturing process steps.

The invention provides a separator which is interposed between adjacent ones of a plurality of electrolyte assemblies each constructed of an electrolyte layer containing an electrolyte medium and a catalytic electrode disposed on a surface in a thickness-wise direction of the electrolyte layer, comprising a separating section for achieving separation between a fuel gas channel and an oxidizer gas channel; and a sealing section disposed along an outer periphery of the separator, for preventing leakage of fuel gas and oxidizer gas, the separating section and the sealing section being integrally formed with each other, wherein a region corresponding to the sealing section is provided with a sealing projection which is formed so as to extend in parallel with the surface of the electrolyte assembly on which the catalytic electrode is formed, a vertex of which is brought into pressure-contact with the electrolyte assembly under a resilient force, and a sectional profile of the sealing projection perpendicular to a direction in which fuel gas and oxidizer gas flow is U-shaped or V-shaped.

According to the invention, the separator is designed to be interposed between the adjacent ones of a plurality of electrolyte assemblies each constructed of an electrolyte layer containing an electrolyte medium and a catalytic electrode disposed on a surface in a thickness-wise direction of the electrolyte layer. The separator is composed of: a separating section for achieving separation between a fuel gas channel and an oxidizer gas channel; and a sealing section disposed along the outer periphery of the separator, for preventing leakage of fuel gas and oxidizer gas.

The region corresponding to the sealing section is provided with a sealing projection which is formed so as to extend in parallel with the surface of the electrolyte assembly on which the catalytic electrode is formed, the vertex of which is brought into pressure-contact with the electrolyte assembly under a resilient force, and a sectional profile of the sealing projection perpendicular to a direction in which fuel gas and oxidizer gas flow is U-shaped or V-shaped.

This makes it possible to eliminate the need to prepare a sealing member such as an O-ring or a gasket that has conventionally been required to effect sealing, and thereby reduce the number of the constituent components of a fuel cell and also reduce the number of manufacturing process steps.

The invention is characterized in that the separating section and the sealing section are formed integrally with each other by means of plastic deformation processing.

According to the invention, since the separating section and the sealing section are formed integrally with each other, it is possible to reduce the number of manufacturing process steps.

The invention is characterized in that the separator is constituted by a metal sheet.

According to the invention, the separator is constituted by a metal sheet, so that it is possible to perform plastic deformation processing with ease.

The invention is characterized in that the separating section has a plurality of parallelly arranged U-shaped channels positioned in parallel with the surface of the electrolyte assembly on which the catalytic electrode is formed.

The invention is characterized in that the separating section and the sealing section are formed by means of press working.

According to the invention, the separating section has a plurality of parallelly arranged U-shaped channels positioned in parallel with the surface of the electrolyte assembly on which the catalytic electrode is formed. Further, the separating section and the sealing section are formed by means of press working.

Thus, in performing plastic deformation processing on the separator, all that needs to be done is simply to create the channels and the sealing projection.

The invention is characterized in that the sealing projection has, at least in its area to be contacted by the electrolyte layer, a high polymer elastic layer formed of an elastic body.

According to the invention, the sealing projection has, at least in its area to be contacted by the electrolyte layer, a high polymer elastic layer formed of an elastic body. This helps improve the sealability even further.

The invention is characterized in that the high polymer elastic layer has a width ranging from 1 to 10 mm and a thickness ranging from 1 to 100 μm.

According to the invention, the high polymer elastic layer, although it is formed in a limited space, makes it possible to attain sufficiently high sealability.

The invention is characterized in that two or more pieces of the sealing projections are provided, with their vertices abutted against the electrolyte layer, and that, given that the location of abutment between the vertex and the electrolyte layer is imaginarily indicated by an abutment line, the two or more abutment lines are arranged in parallel with each other.

According to the invention, it is possible to improve the sealability even further.

The invention is characterized in that the separator has an auxiliary projection analogous to the sealing projection formed in the region other than the sealing section and the separating section, and that the auxiliary projection is disposed in such a way as to make uniform the distribution of contact pressure which occurs between the separator and the electrolyte assembly at the time of assembly of the fuel cell including the separator.

According to the invention, it is possible to avoid any inconvenience such as improper contact which occurs between the separator and the electrolyte assembly due to for example tilting of the separator in the course of assembly.

The invention is characterized in that the separating section is formed of a metal sheet, and the metal sheet has its surface coated with a rubber- or synthetic resin-made coating layer.

According to the invention, the metal sheet has its surface coated with a rubber- or synthetic resin-made coating layer. This makes it possible to produce a separator which is excellent in workability and corrosion resistance.

The invention is characterized in that the coating layer exhibits electrical conductivity.

According to the invention, the coating layer exhibits electrical conductivity, wherefore a DC power generated in the electrolyte assembly can be taken out and collected by way of the separator.

The invention is characterized in that the coating layer is so formed as to cover the surface of the metal sheet, with an adherent layer or a surface-treated layer lying therebetween.

According to the invention, the coating layer is so formed as to cover the surface of the metal sheet, with an adherent layer or a surface-treated layer lying therebetween. In a case where the adherability of the coating layer and the metal sheet is found to be low, the insertion of the adherent layer or surface-treated layer is effective. The surface-treated layer is formed by removing the oxide film deposited on the surface of the metal sheet or by subjecting the surface of the metal sheet to surface roughing treatment. Through the surface-treated layer thus obtained, the coating layer can be formed on the surface of the metal sheet. Moreover, in the case of using a rubber material to form the coating layer, as an adhesive for use, a triazinethiol- or polyaniline-base compound is desirable. The triazinethiol-base compound is diffused around the surface of the metal sheet, thereby forming the adherent layer. The adherent layer thus obtained allows adhesion of the metal sheet to the rubber material. Another advantage is that the triazinethiol-base compound exhibits electrical conductivity, wherefore the DC power generated in the electrolyte assembly can be taken out and collected by way of the separator.

The invention is characterized in that in a region of the coating layer which makes contact with the electrolyte assembly is formed a high conductive layer that is higher in electrical conductivity than the coating layer.

According to the invention, it is possible to reduce the contact resistance between the separator and the electrolyte assembly.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
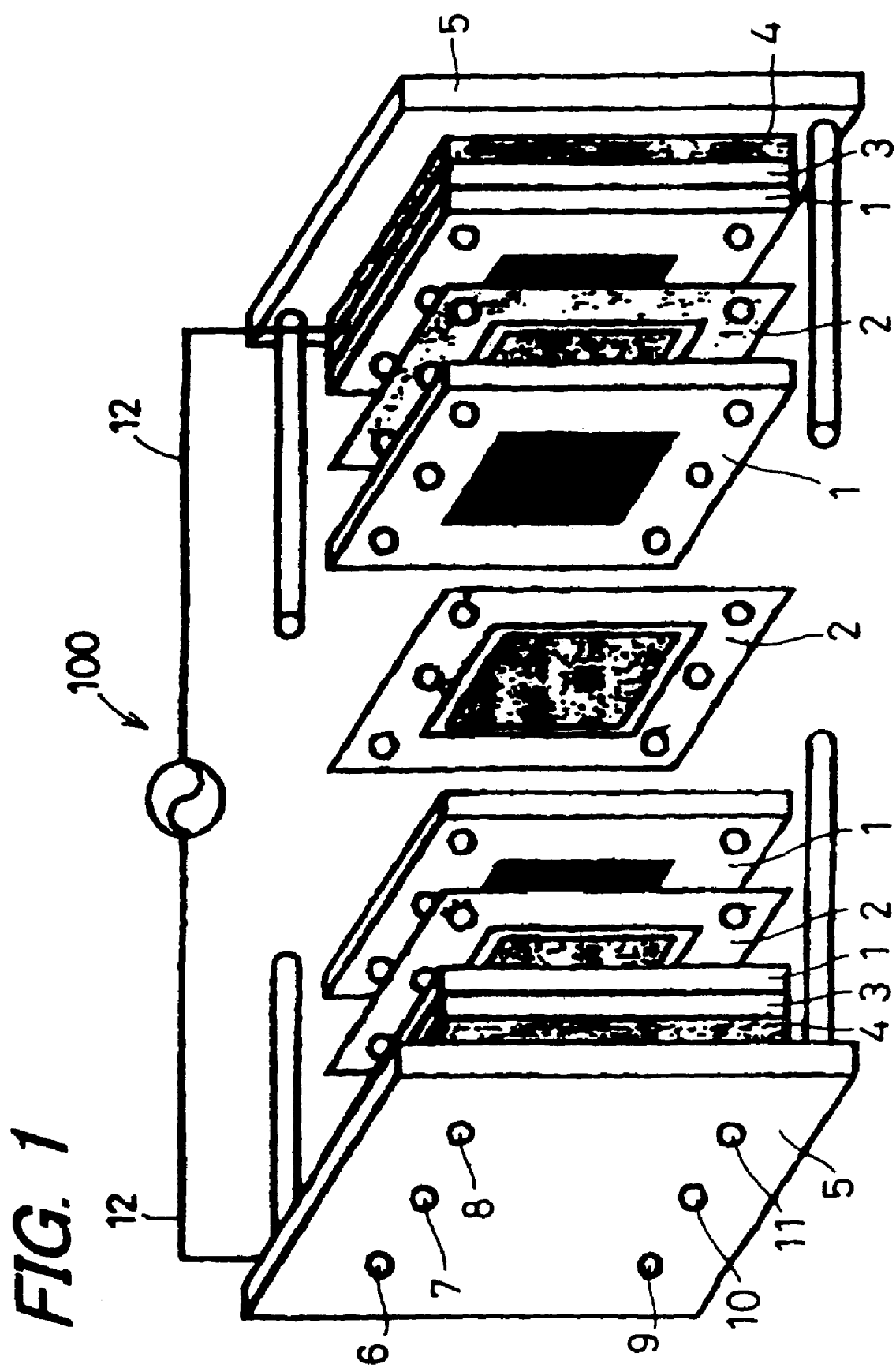
FIG. 1 is an exploded perspective view schematically showing a polymer electrolyte fuel cell (abbreviated as PEFC) 100.

FIG. 1 is an exploded perspective view schematically showing a polymer electrolyte fuel cell (PEFC for short) 100. The PEFC 100 is composed of: a separator 1; a fuel cell 2; a power collector plate 3; an insulating sheet 4; an end flange 5; and an electrode wiring 12. The PEFC 100 is constructed such that a plurality of the fuel cells 2 are connected in series with one another to form a so-called stack cell structure capable of providing high-voltage and high-output characteristics. In order to constitute the stack cell structure, the separator is interposed between the adjacent fuel cells 2 to effect the supply of hydrogen and oxygen to each of the fuel cells 2, as well as to collect generated electricity. Accordingly, as shown in FIG. 1, the fuel cells 2 and the separators 1 are arranged in an alternating manner. In the stack cell structure, the separator 1 is arranged as an outermost layer. Outside the separator 1 is arranged the power collector plate 3 to which the electrode wiring 12 is connected. The electricity collected in each of the separators 1 is accumulated in the power collector plate 3, thereby achieving electric power production. The insulating sheet 4 is interposed between the power collector plate 3 and the end flange 5 to prevent electric current from leaking from the power collector plate 3 to the end flange 5. The end flange 5 serves as a casing for keeping a plurality of the fuel cells 2 in a stack cell state.

In the end flange 5 are formed a hydrogen gas inlet 6, a coolant inlet 7, an oxygen gas inlet 8, a hydrogen gas outlet 9, a coolant outlet 10, and an oxygen gas outlet 11. A gaseous substance as well as a water fluid supplied through the inlet flows over a forward path penetrating in the direction in which the fuel cells 2 are stacked on top of one another so as to reach the outermost separator 1, then turns back to flow over a backward path, and is eventually discharged from the outlet.

The forward and backward paths are formed in a branched state in each of the separators 1. A fluid flowing over the forward path is allowed to flow into the backward path through channels formed in the separator 1 in parallel with the direction of the surface of the fuel cell 2. Hydrogen gas as well as oxygen gas is consumed in the fuel cell 2, wherefore unreacted gas is discharged through the backward path. The discharged unreacted gas is collected so that it can be supplied through the inlet once again. In the vicinity of the oxygen gas channel, oxygen and hydrogen react with each other to form water. Therefore, discharged oxygen gas contains water. The discharged oxygen gas cannot be re-supplied without removing the water contained therein.

Hydrogen gas and oxygen gas, namely fuel gas and oxidizer gas, do not necessarily have to be gas consisting solely of hydrogen and gas consisting solely of oxygen, respectively. That is, the gas for use may contain a gaseous substance other than hydrogen and oxygen so long as the channel is free from quality degradation or degeneration through contact with the gas. For example, nitrogenous air can be used as oxygen gas. Moreover, the source of hydrogen is not limited to hydrogen gas, but may be of another gaseous substance such as methane gas, ethylene gas, and natural gas. The use of ethanol or the like substance is also possible.

Figure 2:
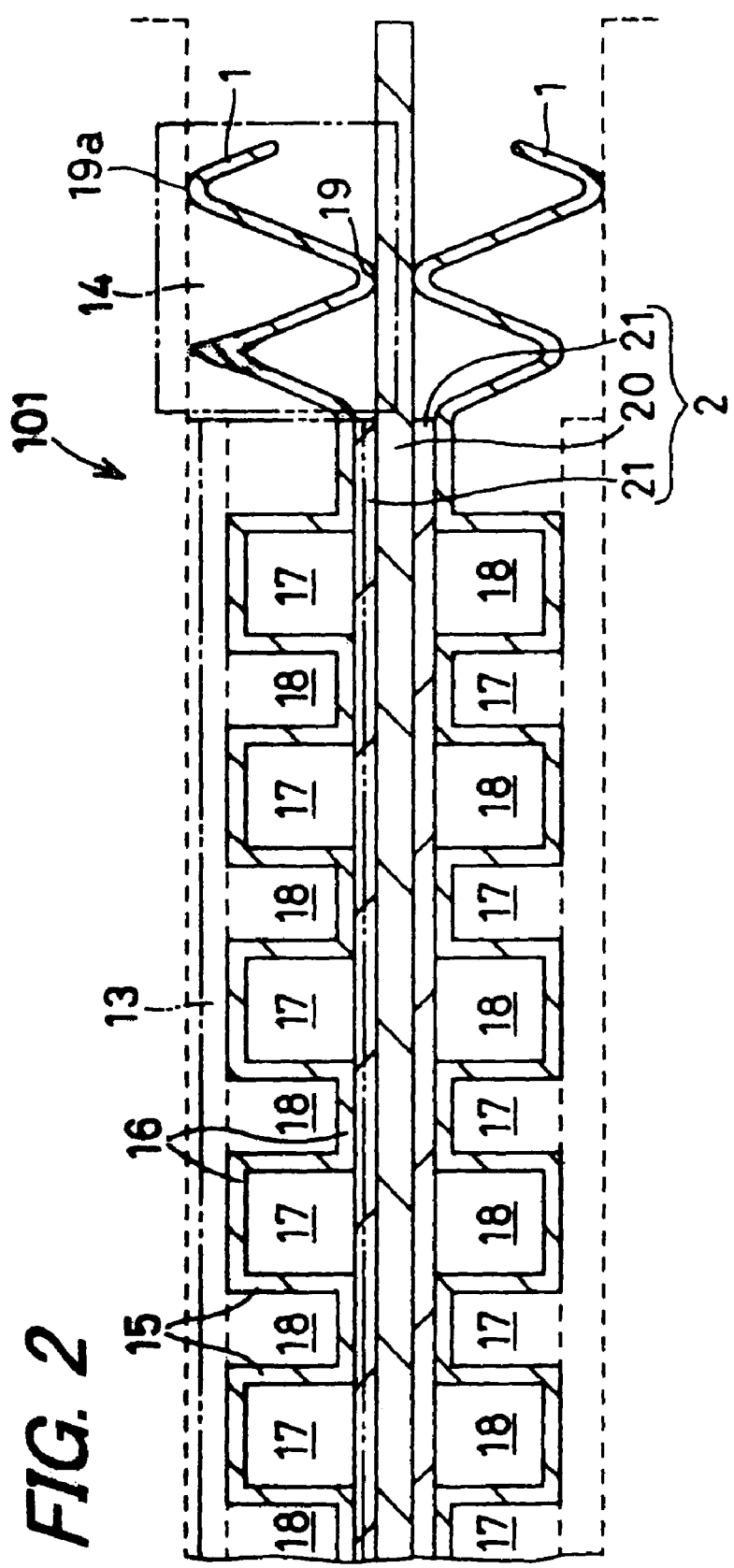
FIG. 2 is a horizontal sectional view of a unit cell 101 including a separator 1.

FIG. 2 is a horizontal sectional view of a unit cell 101 including the separator 1. The unit cell 101 is composed of a single fuel cell 2 with two pieces of the separators 1 arranged on both sides. The unit cell 101 refers to a minimum unit of a cell capable of generating electricity through the supply of hydrogen and oxygen.

The fuel cell 2, namely an electrolyte assembly is composed of a high polymer membrane 20 acting as an electrolyte medium and a catalytic electrode 21 formed on the surface of the high polymer membrane 20 in its thickness-wise direction. The fuel cell 2 is also referred to as MEA (Membrane Electrode Assembly).

The high polymer membrane 20 is formed as a proton-conducting electrolyte membrane through which hydrogen ion (proton) is allowed to pass. In general, a perfluoro sulfonic acid resin membrane (for example, Nafion (tradename) manufactured by Du pont Co., Ltd.) is preferably used.

The catalytic electrode 21 is stacked on the thickness-wise surface of the high polymer membrane 20 as a carbon layer containing catalytic metal such as platinum and ruthenium. When the catalytic electrode 21 is supplied with hydrogen gas and oxygen gas, an electrochemical reaction takes place at the interface between the catalytic electrode 21 and the high polymer membrane 20, thus generating DC power.

The high polymer membrane 20 is approximately 0.1 mm in thickness. The catalytic electrode 21 has, depending upon the kind of catalytic metal contained therein, a thickness of several μm.

The separator 1 is composed of a separating section 13 for achieving separation between a hydrogen gas channel and an oxygen gas channel, and a sealing section 14 for preventing leakage of hydrogen gas and oxygen gas. In the present embodiment, to be exact, the catalytic electrode 21 is not so formed as to cover the entire surface of the high polymer membrane 20, but is formed in a manner such that the high polymer membrane 20 is partly exposed at the outer periphery in a range of from 1 to 20 mm, more preferably 5 to 10 mm in width. In the separator 1, the separating section 13 is formed in the region positioned face to face with the catalytic electrode 21, whereas the sealing section 14 is formed in the region positioned face to face the exposed part of the high polymer membrane 20.

A platy thin metal is used as a principal material to form the separator 1. For example, it is preferable to use a metal thin sheet made of iron, aluminum, or titanium. Especially a stainless (SUS 304, for example) steel sheet, a SPCC (cold-rolled steel sheet for general purposes), and an anti-corrosion steel sheet are desirable. In the case of using a stainless steel sheet, there is a need to perform surface treatment thereon, for example, acid pickling, electrolytic etching, electrically conductive medium inclusion, BA coating formation, or ion plating process for coating an electrically conductive compound. It is also possible to use a highly corrosion-resistant stainless steel sheet having a hyperfine crystalline structure.

By subjecting such a metal thin sheet as mentioned just above to plastic deformation processing, for example, press working, it is possible to form the separating section 13 and the sealing section 14 in a single piece construction. Note that it is preferable to perform BH (Baked Hardening) treatment after the completion of the press working from the standpoint of enhancement in heat resistance.

The separating section 13 has a plurality of parallelly arranged channels positioned in parallel with the surface on which the catalytic electrode 21 is formed. The channel has a concavely curved, U-shaped sectional profile when viewed in a direction perpendicular to the direction in which a gaseous substance flows. The channel is composed of a partition wall 15 and an electrode contact wall 16. A space surrounded by the partition wall 15, the electrode contact wall 16, and the catalytic electrode 21 constitutes a hydrogen gas channel 17 as well as an oxygen gas channel 18. The hydrogen gas channel 17 and the oxygen gas channel 18 are partitioned off by the partition wall 15 to avoid mixing of hydrogen gas and oxygen gas. The electrode contact wall 16 makes contact with the catalytic electrode 21 to take out the DC power generated at the interface between the high polymer membrane 20 and the catalytic electrode 21 as a DC current. The DC current thus obtained is allowed to pass through the partition wall 15 and another electrode contact wall 16, and is then collected by the power collector plate.

The adjacent channels are formed in a manner such that their open faces are oriented in opposite directions. In conformity therewith, the hydrogen gas channel 17 and the oxygen gas channel 18 are arranged side by side. That is, the arrangement of gas passages are so adjusted that any catalytic electrode 21 portion makes contact only with predetermined one and the same gaseous substance. Moreover, as shown in FIG. 2, the two separators 1 for constituting a single unit cell 101 are so arranged that the openings of the channels of one separator 1 confront their corresponding openings of the channels of the other separator 1, with the fuel cell 2 lying therebetween. That is, the two separators 1 are disposed in surface-symmetrical relation to each other with respect to the center of the fuel cell 2. However, such a surface-symmetrical relation does not hold true for the arrangement of the gas channels. They are so arranged that given two channels placed on the opposite sides of the fuel cell 2 deal with different gaseous substances. For example, as shown in FIG. 2, of the two gas channels placed on the opposite sides of the fuel cell 2, one acts as the hydrogen gas channel 17 and the other acts as the oxygen gas channel 18.

Thus arranged, the separators 1 with the gas channels allow electric power production.

The substances to be supplied to the flow passage constituted by the channel and the catalytic electrode 21 are not limited to hydrogen gas and oxygen gas, but may be of another substance such as coolant. In the case of using coolant, it is preferable to pass the coolant through both of the channels placed on the opposite sides of the fuel cell 2.

The sealing section 14 is provided with a sealing projection extending in parallel with the surface on which the catalytic electrode 21 is formed. The sealing projection has a U-shaped or V-shaped sectional profile when viewed in a direction perpendicular to the direction in which a gaseous substance flows. A vertex 19 of the sealing projection is brought into pressure-contact with the exposed part of the high polymer membrane 20 under a resilient force. At the position of contact therebetween, sealing is effected to prevent leakage of hydrogen gas and oxygen gas. Moreover, by imparting an inverted U-shaped or inverted V-shaped configuration to the sealing projection, it is possible to reduce the area of contact between the vertex 19 and the high polymer membrane, and thereby achieve a high-pressure sealing effect as achieved in the case of using an O-ring.

Figure 3A:
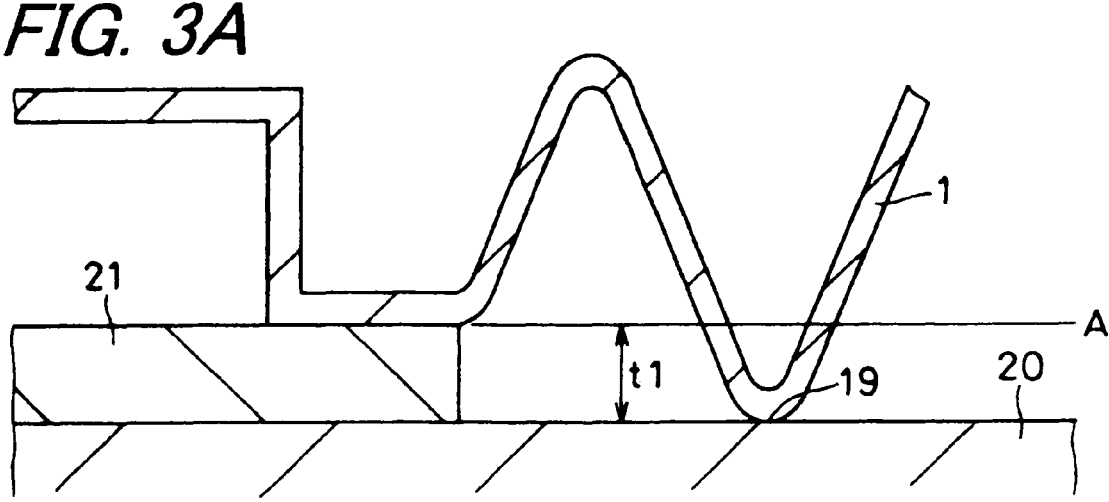
FIG. 3 is a view of assistance in explaining the shape of a sealing section 14 designed for generating a resilient force.
Figure 3B:
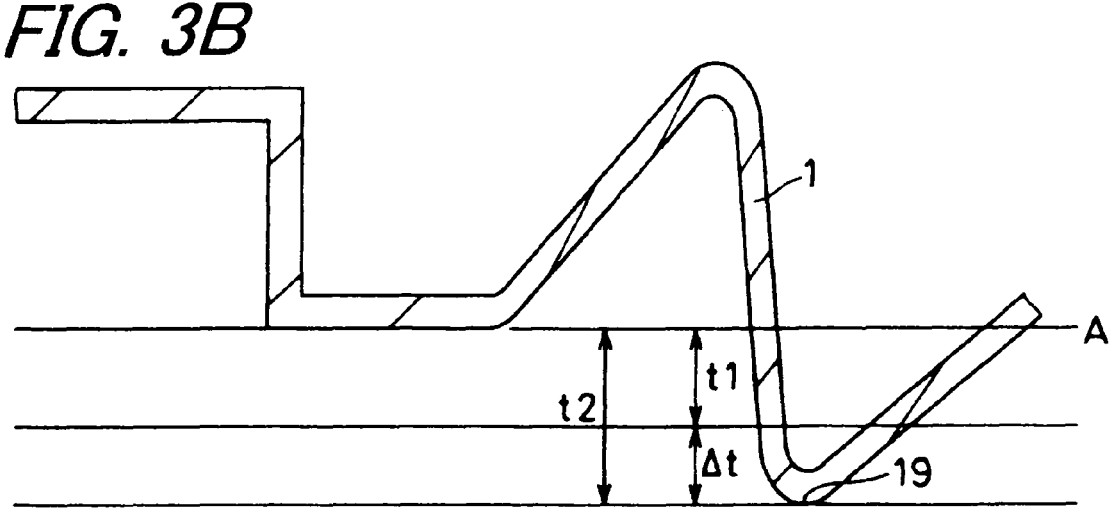

In order to bring the vertex 19 of the sealing projection into pressure-contact with the high polymer membrane 20 successfully under a resilient force, the sealing section 14 is formed in a manner such that, when the separator 1 is kept out of contact with the high polymer membrane 20, namely when the PEFC 1 is in its yet-to-be assembled condition, the vertex 19 of the sealing projection extends beyond the position of contact with the high polymer membrane 20 in contrast to the case where the PEFC 1 is in its assembled condition. More specifically, as shown in FIG. 3A, when the PEFC 1 is in its assembled condition, the vertex 19 of the sealing projection assumes a position such that, with respect to a virtual surface A of contact with the catalytic electrode 21, the distance between the vertex 19 and the surface of contact with the catalytic electrode 21 is defined by t1, which is equivalent to the thickness of the catalytic electrode 21. Accordingly, as shown in FIG. 3B, when the PEFC 1 is in its yet-to-be assembled condition, the vertex 19 of the sealing projection assumes a position such that the distance between the vertex 19 and the surface of contact with the catalytic electrode 21 is defined by t2, which is larger than the value t1. Since the junction between the separating section 13 and the sealing projection acts as a spring, it follows that the pressure force under which the vertex 19 is brought into contact with the high polymer membrane in accompaniment with the assembly process is dependent upon a resilient force exerted by the spring and the area of contact. In accordance with Hooke's law, the resilient force is obtained by multiplying a spring constant (elastic constant) by the amount of displacement. In the separator 1, the spring constant is determined according to the material of the separator 1 and the shape of the sealing section 14, and the amount of displacement is given by: $\Delta t = t2 - t1$. Therefore, by making changes to the value t2 at the time of press working, with the spring constant determined in consideration of the predetermined separator's material and sealing section's shape, it is possible to adjust the sealing pressure with ease. It is needless to say that changes may be made in the separator's material as well as in the sealing section's shape for the purpose of attaining an optimal sealing pressure.

As described previously, the two separators 1 having sandwiched therebetween the fuel cell 2 are disposed in surface-symmetrical relation to each other. Correspondingly, the pressure-contact positions of the two vertices 19 are disposed in surface-symmetrical relation to each other with respect to the center of the fuel cell 2. By arranging the pressure-contact positions of the two vertices 19 face to face with each other, it is possible to improve the sealability. Note that the above stated BH treatment makes it possible to retard stress alleviation in the sealing section 14, and thereby maintain the improved sealability.

Figure 4:
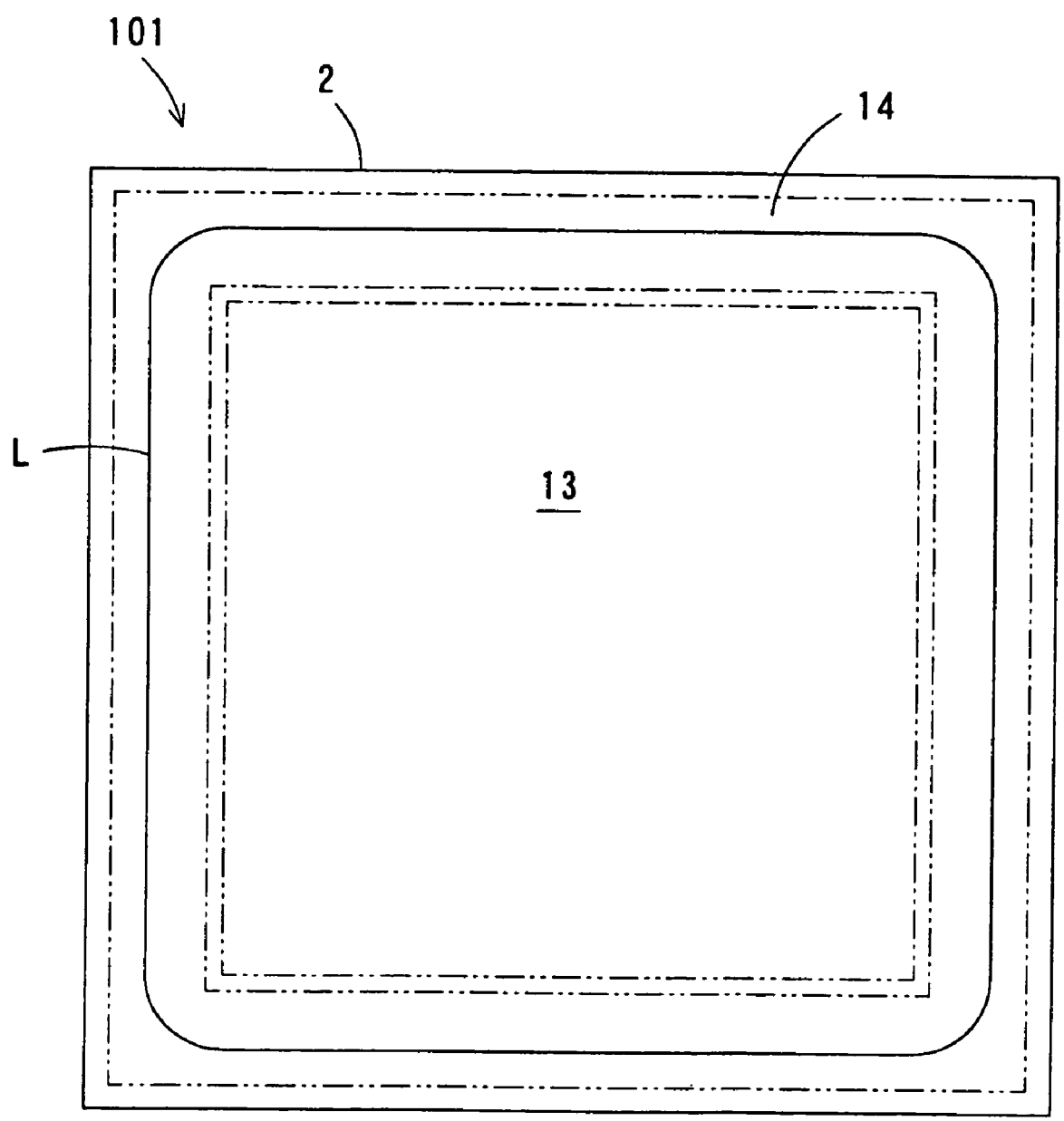
FIG. 4 is a schematic view showing the unit cell 101 as seen from a side.

FIG. 4 is a schematic view showing the unit cell 101 as seen from a side. The unit cell 101 has the separating section 13 formed in the midportion thereof, and has the sealing section 14 formed along the outer periphery thereof. In FIG. 4, specifics on the configurations of the separating section 13 and the sealing section 14 are omitted. In the sealing section 14, the vertex 19 of the sealing projection is kept in abutment with the high polymer membrane 20. The position of the abutment is imaginarily expressed by an abutment line, namely a seal line L. By forming the seal line L so as to surround the separating section 13, it is possible to avoid leakage of hydrogen gas and oxygen gas.

Moreover, as shown in the horizontal sectional view of FIG. 2, the sealing section has, in its outer peripheral region outwardly of the vertex 19 of the sealing projection, another vertex 19a which is brought into abutment with an adjoining fuel cell to effect sealing. This helps improve the sealability even further. The seal line associated with the vertex 19a and the seal line associated with the vertex 19 are located parallely side by side.

Figure 5:
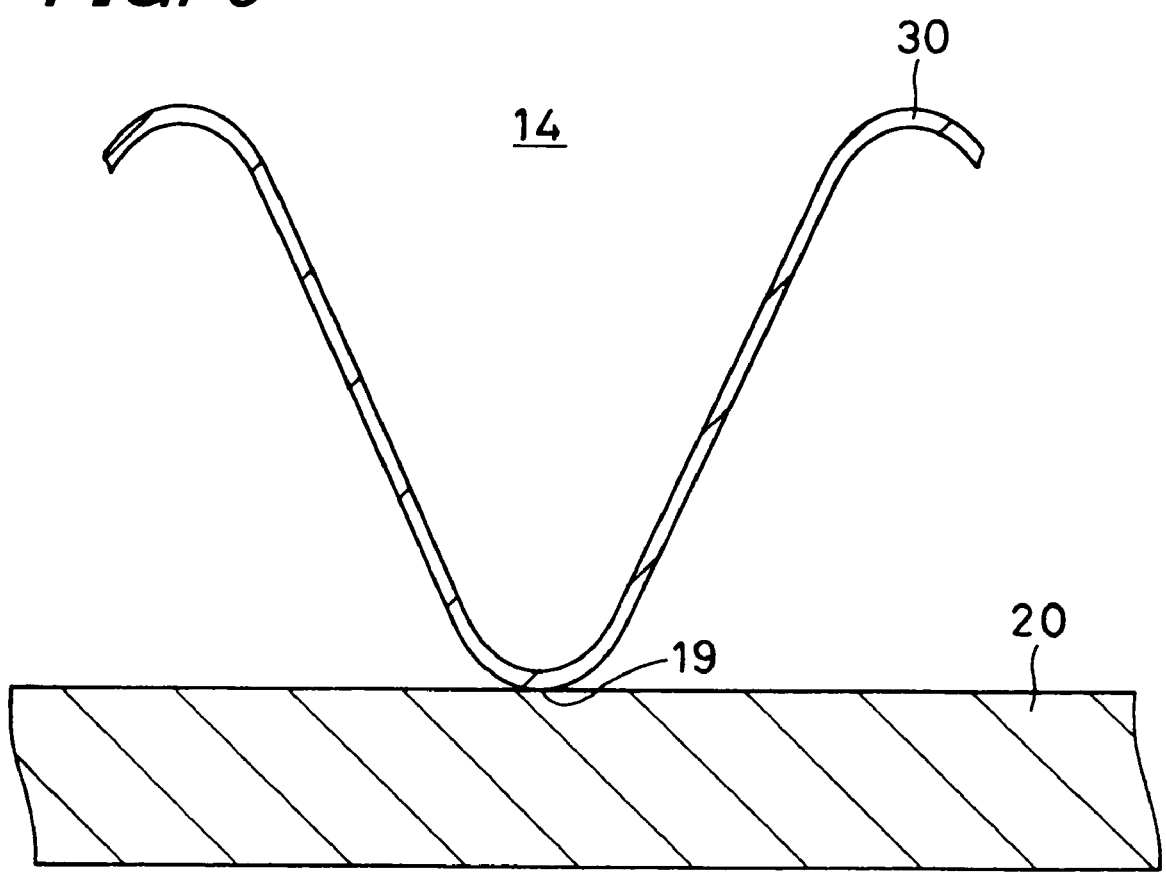
FIG. 5 is an enlarged view of a first embodiment, illustrating the main portion of the sealing section 14.

FIG. 5 is an enlarged view of a first embodiment, illustrating the main portion of the sealing section 14. In the first embodiment, the separator 1 is constituted by a metal thin sheet 30. In the sealing section 14, the metal thin sheet 30 makes contact with the high polymer membrane 20 to effect sealing.

Figure 6:
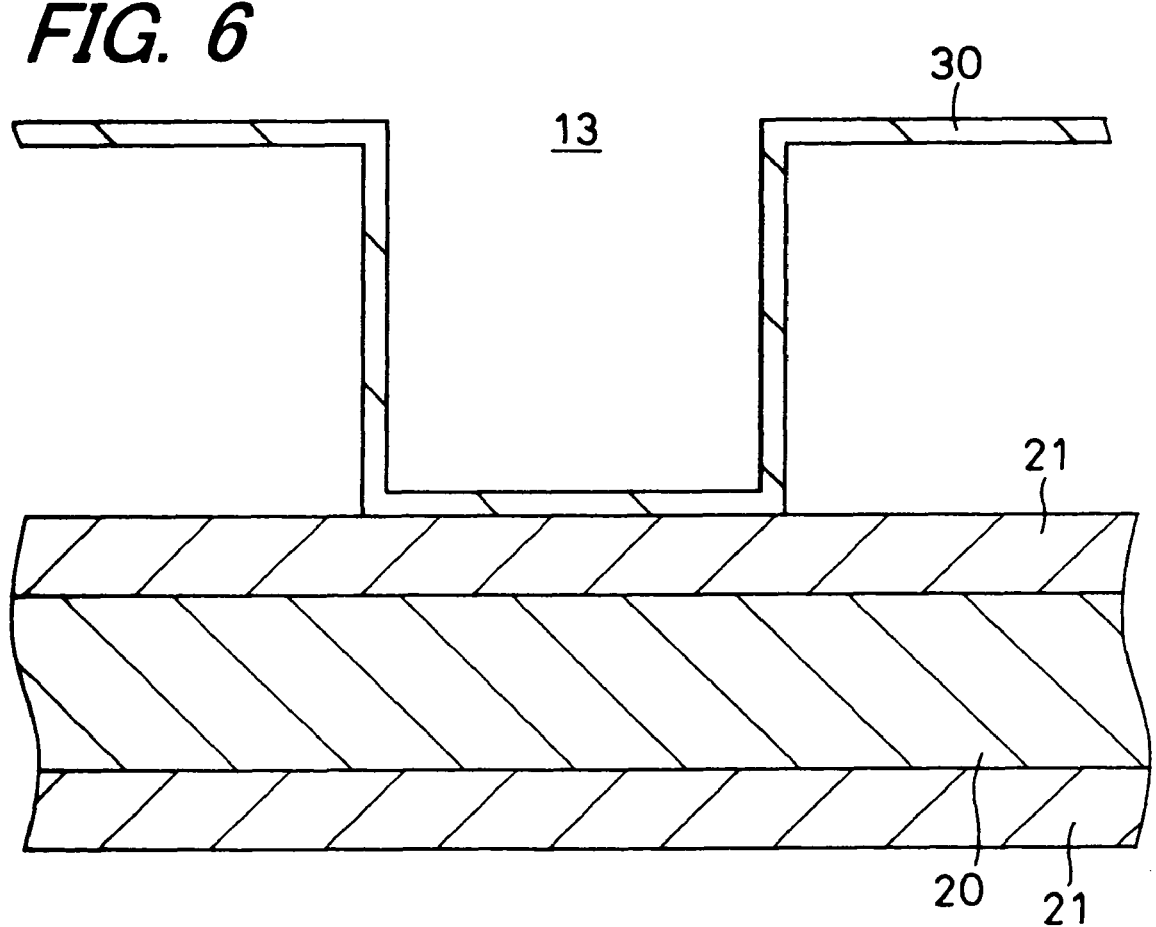
FIG. 6 is an enlarged view of the first embodiment, illustrating the main portion of a separating section 13.

FIG. 6 is an enlarged view of the first embodiment, illustrating the main portion of the separating section 13. In the separating section 13, the metal thin sheet 30 makes contact with the catalytic electrode 21 to take out the DC power generated at the interface between the high polymer membrane 20 and the catalytic electrode 21 as a DC current. The DC current thus obtained passes through the interior of the separator 1 so as to be collected by the power collector plate.

Figure 7:
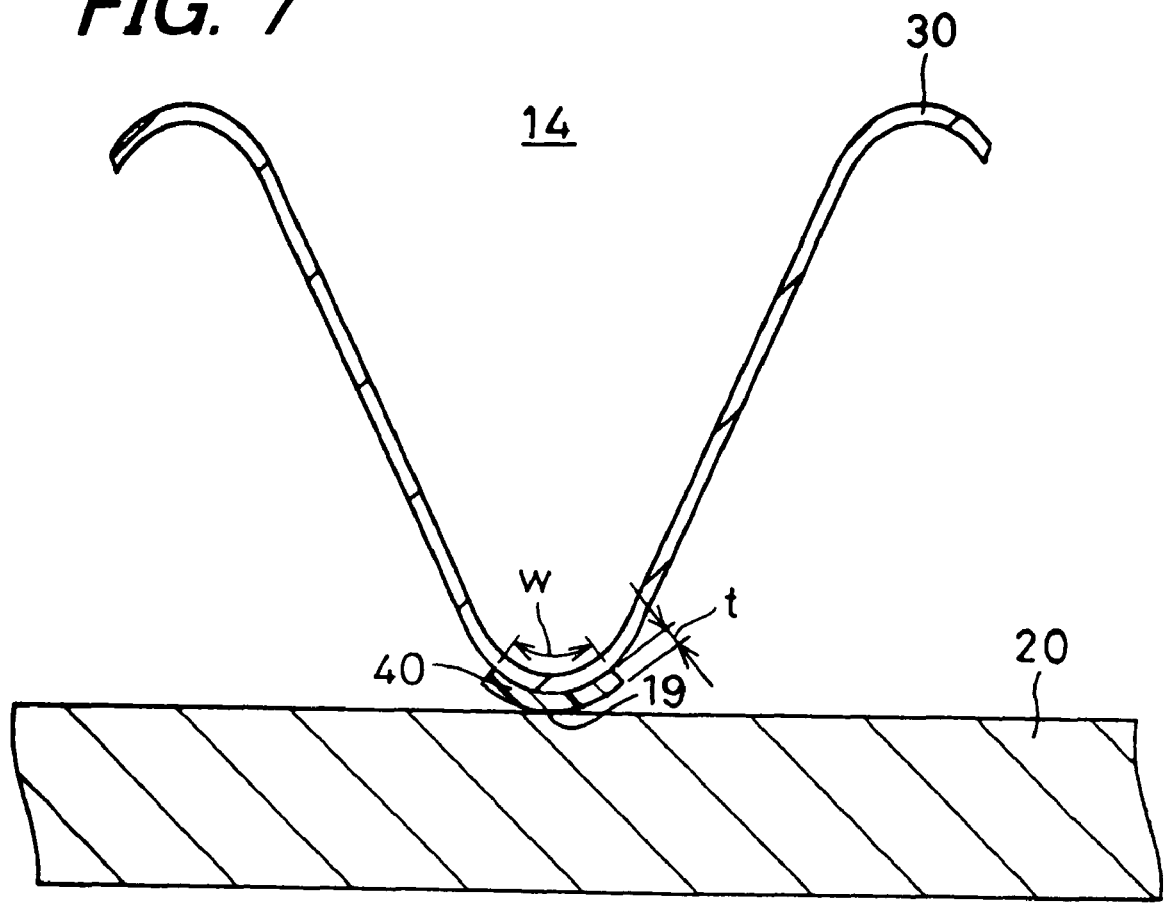
FIG. 7 is an enlarged view of a second embodiment, illustrating the main portion of the sealing section 14.

FIG. 7 is an enlarged view of a second embodiment, illustrating the main portion of the sealing section 14. Also in the second embodiment, the separator 1 is constituted by a metal thin sheet 30. The second embodiment is different from the first embodiment in that, in the sealing section 14, the sealing projection has, in its area to be contacted by the high polymer membrane 20, a high polymer elastic layer 40 which is brought into abutment with the high polymer membrane 20 to effect sealing.

In this construction, higher-than-ever sealability can be attained, wherefore it is no longer necessary to prepare a sealing member such as an O-ring or a gasket that has conventionally been required to effect sealing properly. This makes it possible to reduce the number of the constituent components of the fuel cell, as well as to reduce the number of manufacturing process steps.

Moreover, the sealing projection thus designed, although the high polymer elastic layer 40 thereof is made thin-walled, is capable of offering satisfactory sealing capability, wherefore the degree of stress alleviation can be kept extremely low.

The width W of the high polymer elastic layer 40 in the seal line direction should preferably be set to fall within a range of from 1 to 10 mm, more preferably, 2 to 7 mm. The thickness t of the high polymer elastic layer 40 should preferably be set to fall within a range of from 1 to 100 μm, more preferably, 2 to 50 μm. The high polymer elastic layer 40, although it is formed in a limited space, makes it possible to attain sufficiently high sealability.

When the metal thin sheet 30 is brought into direct contact with the high polymer membrane 20, if, for example, the vertex of the sealing projection is in a deformed state, a minute gap will possibly be developed between the deformed part of the vertex and the surface of the high polymer membrane 20, in consequence whereof there results leakage of fluid through the gap. With consideration given to this fact, in the case of providing an elastic body, namely the high polymer elastic layer 40 in the sealing section 14, as the vertex 19 is placed in a pressure-contact state under a resilient force, the part of contact with the high polymer membrane 20 is caused to deform, thus preventing occurrence of a gap between the vertex and the high polymer membrane 20. This helps improve the sealability.

The high polymer elastic layer 40 is made of rubber or synthetic resin. The preferred examples of usable general-purpose rubber materials include: isoprene rubber; butadiene rubber; styrene-butadiene rubber; butyl rubber; ethylene-propylene rubber; fluorine-containing rubber; silicon rubber; and nitrile rubber. In addition, epichlorohydrin-containing rubber which exhibits impermeability to gaseous substances and heat resistance can be used. Especially the use of addition-polymerized allyl-series polyisobutylene is desirable because of its excellent heat resistance and acid resistance.

Taken up as the preferred examples of usable synthetic resin materials are epoxy resin, urethane-acrylate resin, polyamide resin, silicon resin, and fluorine-containing resin. Especially the use of highly corrosion-resistant fluorine-containing resin is desirable. The specific examples thereof include: PTFE (polytetra fluoroethylene); PFA (tetra fluoroethylene-perfluoroalkyl vinylether copolymer); FEP (tetrafluoroethylene-hexafluoropropylene copolymer); EPE (tetrafluoroethylene-hexafluoropropylene-perfluoroalkyl vinylether copolymer); ETFE (tetrafluoroethylene-ethylene copolymer); PCTFE (polychloro trifluoroetylene); ECTFE (chloro trifluoroetylene-ethylene copolymer); PVDF (polyvinylidene fluoride); PVF (polyviny fluoride); THV (tetrafluoroethylene-hexafluoropropylene-vinylidene fluoride copolymer); VDF-HFP (vinylidene fluoride-hexafluoropropylene copolymer); and TFE-P (vinylidene fluoride-propylene copolymer).

The high polymer elastic layer 40 is brought into intimate contact with the metal thin sheet 30. Specifically, for example, in a case where the metal thin sheet 30 has its surface roughed up by oxidation, the intimate contact can be established by exploiting an anchor effect. It is also possible to use an adhesive to achieve the same effect. The preferred examples thereof include: a resin-base adhesive such as a phenol resin adhesive, a resorcinol resin adhesive, a silicon resin adhesive, and a polyurethane adhesive; a heat-resistant structural adhesive such as a polyimide adhesive, a polyamideimide adhesive, a polybenzimidazole adhesive, and a polyoxadiazole adhesive; an instant glue such as α-cyanoacrylate; and a low-brittleness nylon-epoxy resin or nylon-phenol resin adhesive prepared by blending thermosetting resin (epoxy resin, phenol resin, or the like) with thermoplastic resin (nylon, acetal resin, or the like) and elastomer (nitrile rubber, silicon rubber, or the like).

Note that the high polymer elastic layer 40 does not necessarily have to be stuck firmly to the metal thin sheet 30; that is, the high polymer elastic layer 40 and the metal thin sheet 30 maybe at various intimate-contact strength levels according to the circumstances and requirements. For example, the high polymer elastic layer 40 is brought into intimate contact with the metal thin sheet 30 in a lightly attached state, an adherent state, a lightly bonded state, and a tightly bonded state. Even if the lightly attached state is selected, by obtaining an appropriate fastening contact pressure, sufficiently high sealing capability can be attained. However, if a pressure greater than the fastening contact pressure is applied in a lateral direction relative to the fastening direction, inconveniently, the polymer elastic layer 40 will be displaced sideward or come off. To avoid this, it is desirable to perform surface roughing treatment.

Figure 8:
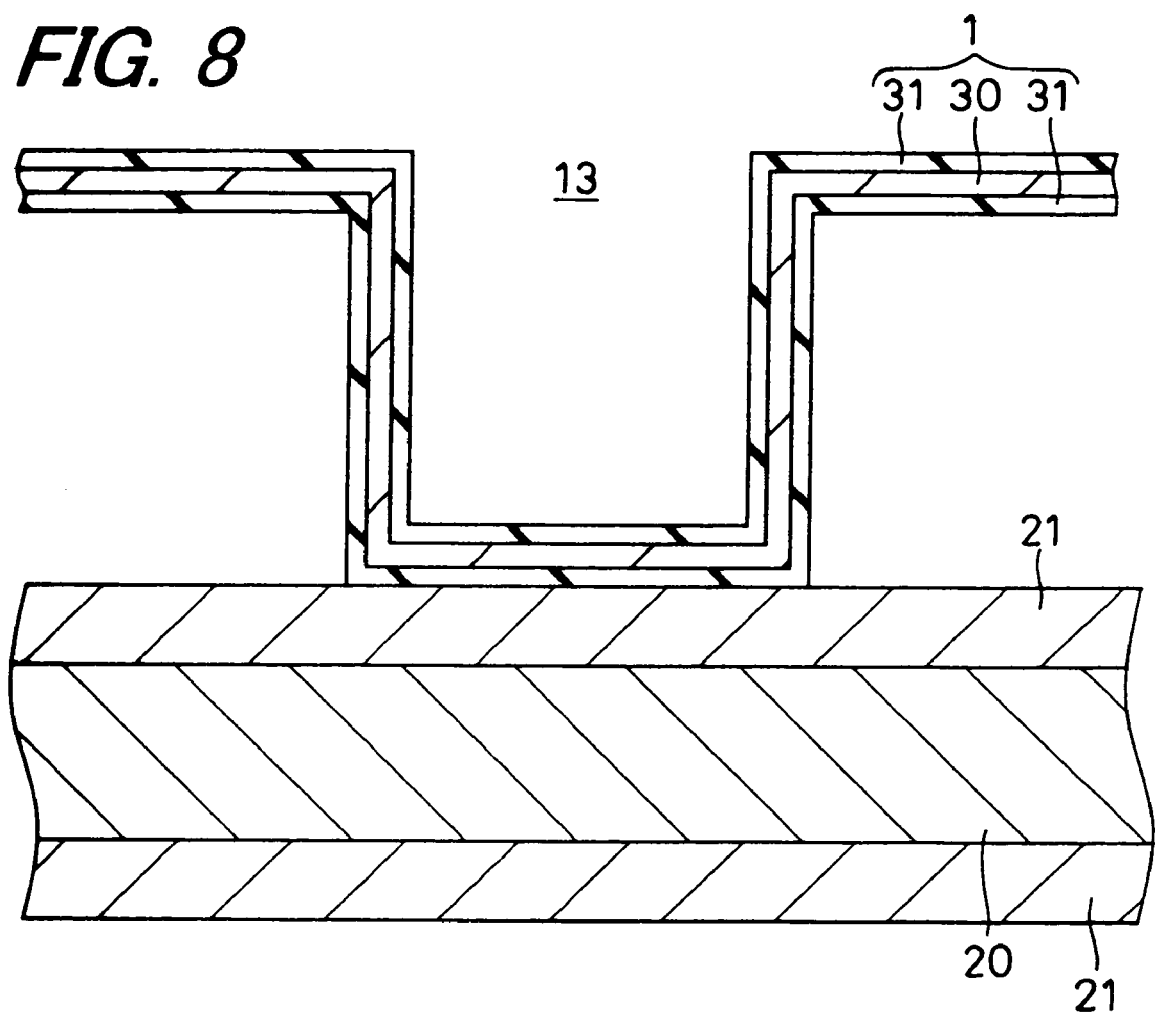
FIG. 8 is an enlarged view of a third embodiment, illustrating the main portion of the separating section 13.

FIG. 8 is an enlarged view of a third embodiment, illustrating the main portion of the separating section 13. In the third embodiment, the separator 1 is composed of a metal thin sheet 30 and a coating layer 31. The coating layer 31 is so formed as to cover the surface of the metal thin sheet 30. In the separating section 13, the coating layer 31 makes contact with the catalytic electrode 21 to take out the DC power generated at the interface between the high polymer membrane 20 and the catalytic electrode 21 as a DC current. The DC current thus obtained passes through the interior of the separator 1 so as to be collected by the power collector plate. The coating layer 31 is made of rubber or synthetic resin which exhibits electrical conductivity. The preferred examples of usable general-purpose rubber materials include: isoprene rubber; butadiene rubber; styrene-butadiene rubber; butyl rubber; and ethylene-propylene rubber. It is also possible to use an electrically conductive rubber material formed of special rubber such as epichlorohydrin-containing rubber having impermeability to gaseous substances and heat resistance added with carbon filler. Especially the use of addition-polymerized allyl-series polyisobutylene added with carbon filler is desirable.

In the case of selecting synthetic resin, it is possible to use an electrically conductive synthetic resin material formed of phenol resin, epoxy resin, fluorine-containing resin, or the like resin added with carbon filler. Especially, just as is the case with the polymer elastic layer 40, the use of highly corrosion-resistant fluorine-containing resin is desirable, but it needs to be added with carbon filler when used for the coating layer 31.

In order for the coating layer 31 to be applied to the surface of the metal thin sheet 30 properly, for example, the metal thin sheet 30 has its surface roughed up by oxidation to form a surface-treated layer. This makes it possible to increase the adherability between the metal thin sheet 30 and the coating layer 31 by exploiting an anchor effect.

Figure 9:
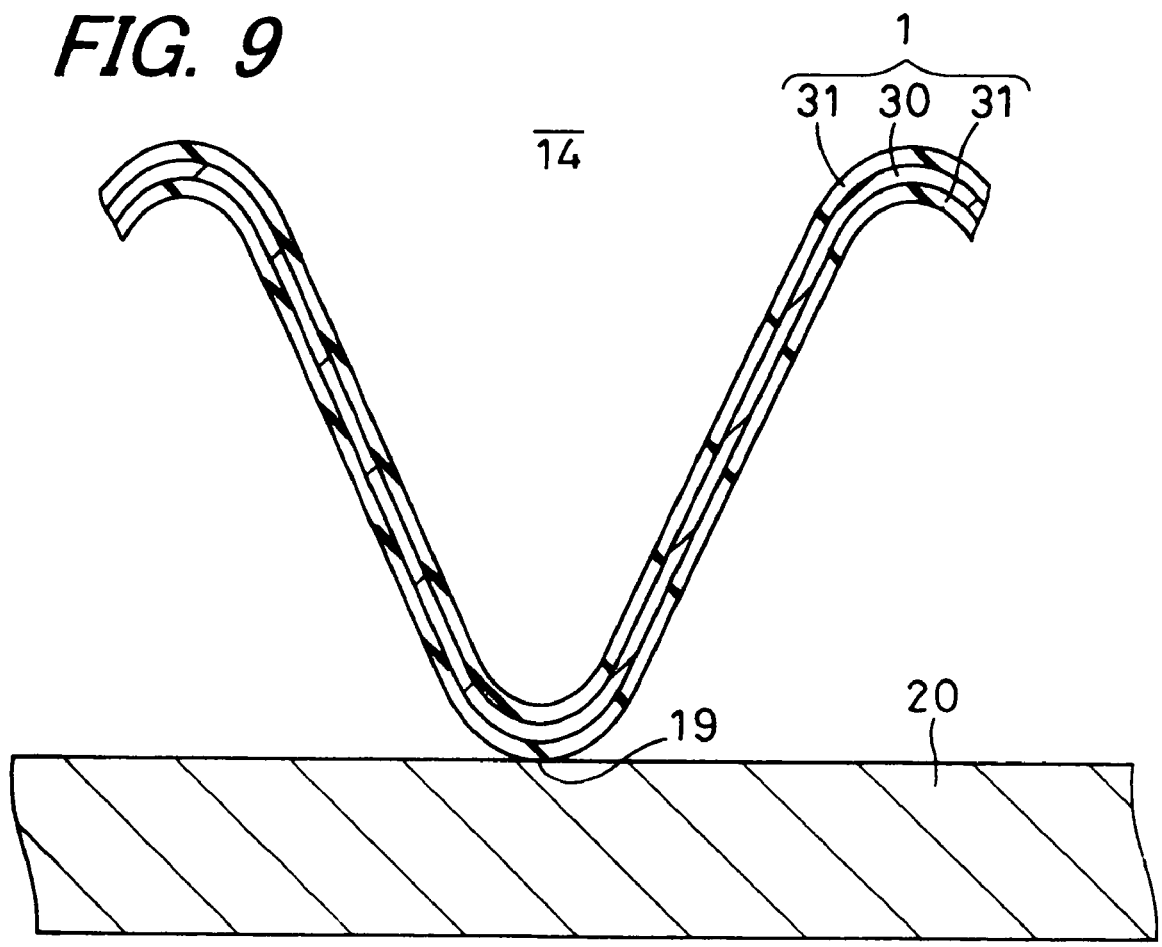
FIG. 9 is an enlarged view of the third embodiment, illustrating the main portion of the sealing section 14.

FIG. 9 is an enlarged view of the third embodiment, illustrating the main portion of the sealing section 14. In the sealing section 14, the coating layer 31 makes contact with the high polymer membrane 20 to effect sealing.

When the metal thin sheet 30 is brought into contact with the high polymer membrane 20, if the vertex 19 of the sealing projection is in a deformed state, a minute gap will possibly be developed between the deformed part of the vertex and the surface of the high polymer membrane 20, in consequence whereof there results leakage of fluid through the gap. With consideration given to this fact, in the case of providing the coating layer 31 formed as an elastic body using rubber or the like material, as the vertex 19 is placed in a pressure-contact state under a resilient force, the part of contact with the high polymer membrane 20 is caused to deform, thus preventing occurrence of a gap. This helps improve the sealability.

Figure 10:
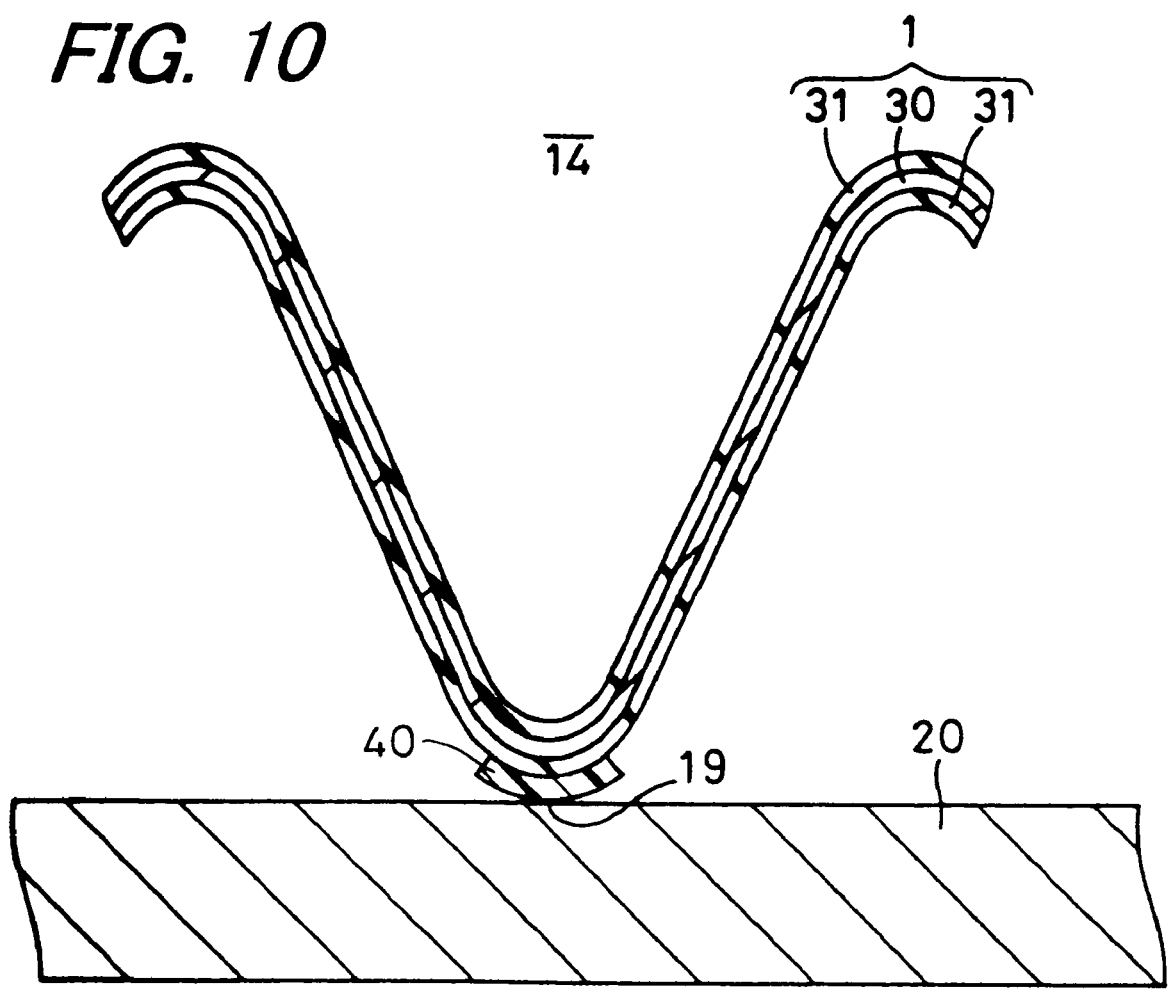
FIG. 10 is an enlarged view of a fourth embodiment, illustrating the main portion of the sealing section 14.

FIG. 10 is an enlarged view of a fourth embodiment, illustrating the main portion of the sealing section 14. Also in the fourth embodiment, the separator 1 is composed of a metal thin sheet 30 and a coating layer 31. The coating layer 31 is so formed as to cover the surface of the metal thin sheet 30. In the sealing section 14, just as in the case of the first embodiment, the sealing projection has, in its area to be contacted by the high polymer membrane 20, a high polymer elastic layer 40 which is brought into abutment with the high polymer membrane 20 to effect sealing. In this regard the fourth embodiment is different from the third embodiment. The high polymer elastic layer 40 is made of a material similar to that used in the second embodiment.

Figure 11:
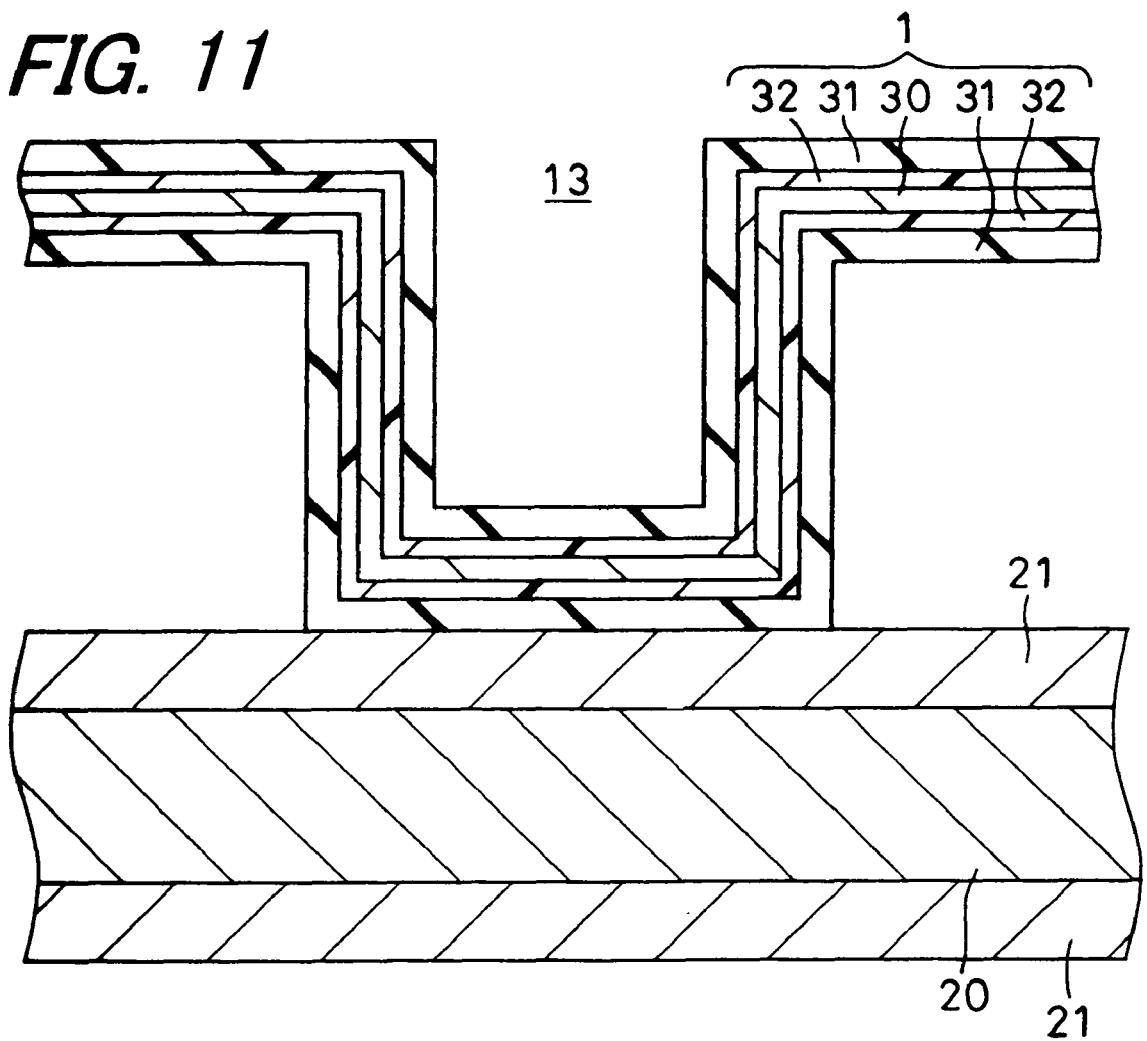
FIG. 11 is an enlarged view of a fifth embodiment, illustrating the main portion of the separating section 13.

FIG. 11 is an enlarged view of a fifth embodiment, illustrating the main portion of the separating section 13. In the fifth embodiment, the separator 1 is composed of a metal thin sheet 30, a coating layer 31, and an adherent layer 32. The coating layer 31 is so formed as to cover the surface of the metal thin sheet 30, with the adherent layer 32 lying therebetween. In the separating section 13, the coating layer 31 makes contact with the catalytic electrode 21 to take out and collect a generated DC power as a DC current. The coating layer 31 may be made of a rubber material similar to that used in the third embodiment.

The adherent layer 32 is created as a diffusion layer on the surface of the metal thin sheet 30 through application of a coating of an electrically conductive coupling agent typified by a triazinethiol-base compound, as well as a coating of doped electrically conductive polymer typified by a polyaniline-base compound. The triazinethiol- or polyaniline-base compound diffused over the surface of the metal exhibits electrical conductivity, thus ensuring electrical conductivity with respect to the resin layer 32 so as to take out a generated DC power as a DC current.

Figure 12:
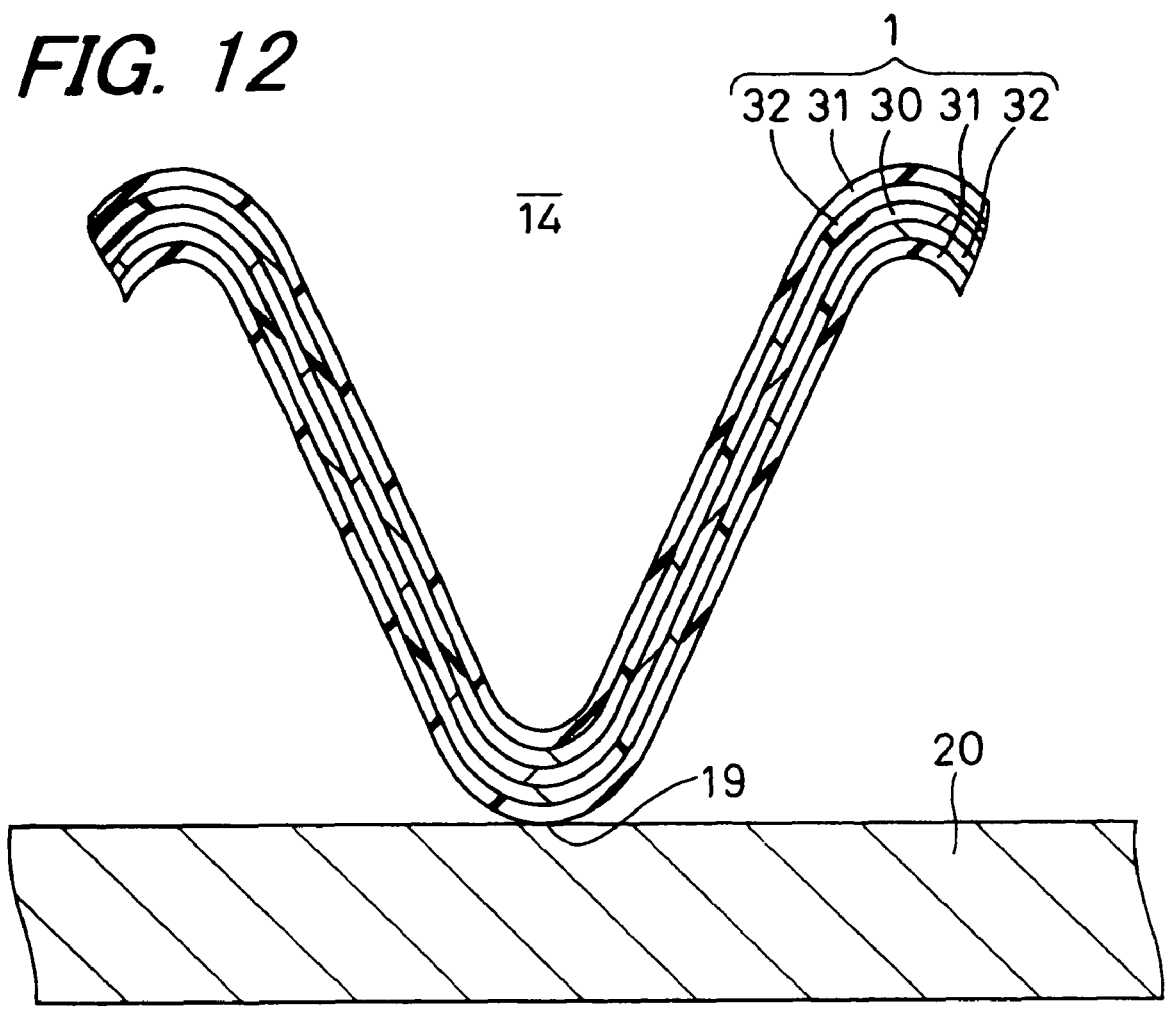
FIG. 12 is an enlarged view of the fifth embodiment, illustrating the main portion of the sealing section 14.

FIG. 12 is an enlarged view of the fifth embodiment, illustrating the main portion of the sealing section 14. In the sealing section 14, the coating layer 31 makes contact with the high polymer membrane 20 to effect sealing. The coating layer 31 and the adherent layer 32 are each made of a material similar to that used in the separating section 13.

Figure 13:
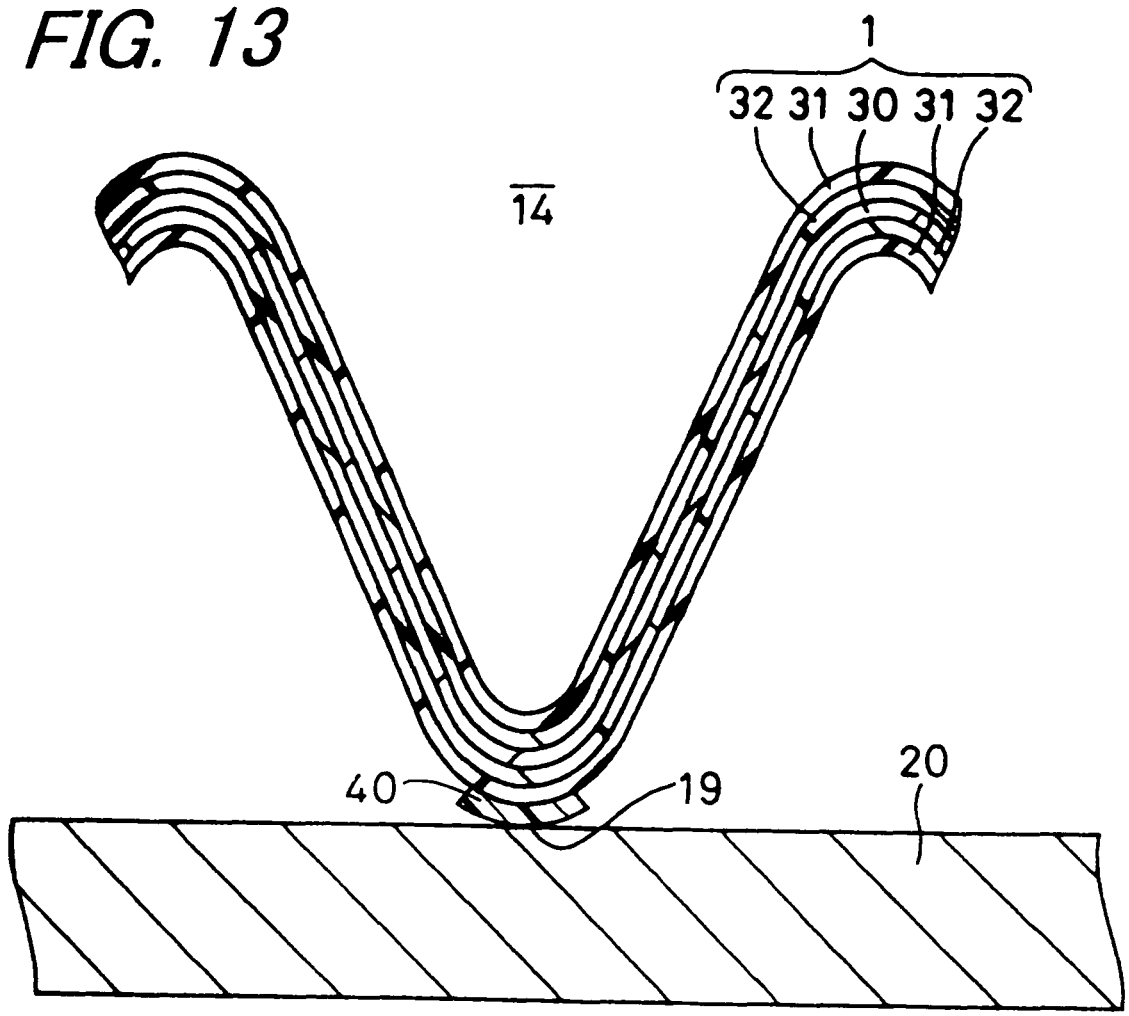
FIG. 13 is an enlarged view of a sixth embodiment, illustrating the main portion of the sealing section 14.

FIG. 13 is an enlarged view of a sixth embodiment, illustrating the main portion of the sealing section 14. In the sixth embodiment, the separator 1 is composed of a metal thin sheet 30, a coating layer 31, and an adherent layer 32. The coating layer 31 is so formed as to cover the surface of the metal thin sheet 30, with the adherent layer 32 lying therebetween. In the sealing section 14, the sealing projection has, in its area to be contacted by the high polymer membrane 20, a high polymer elastic layer 40 which is brought into abutment with the high polymer membrane 20 to effect sealing. In this regard the sixth embodiment is different from the fifth embodiment. The high polymer elastic layer 40 is made of a material similar to that used in the second embodiment.

Figure 14:
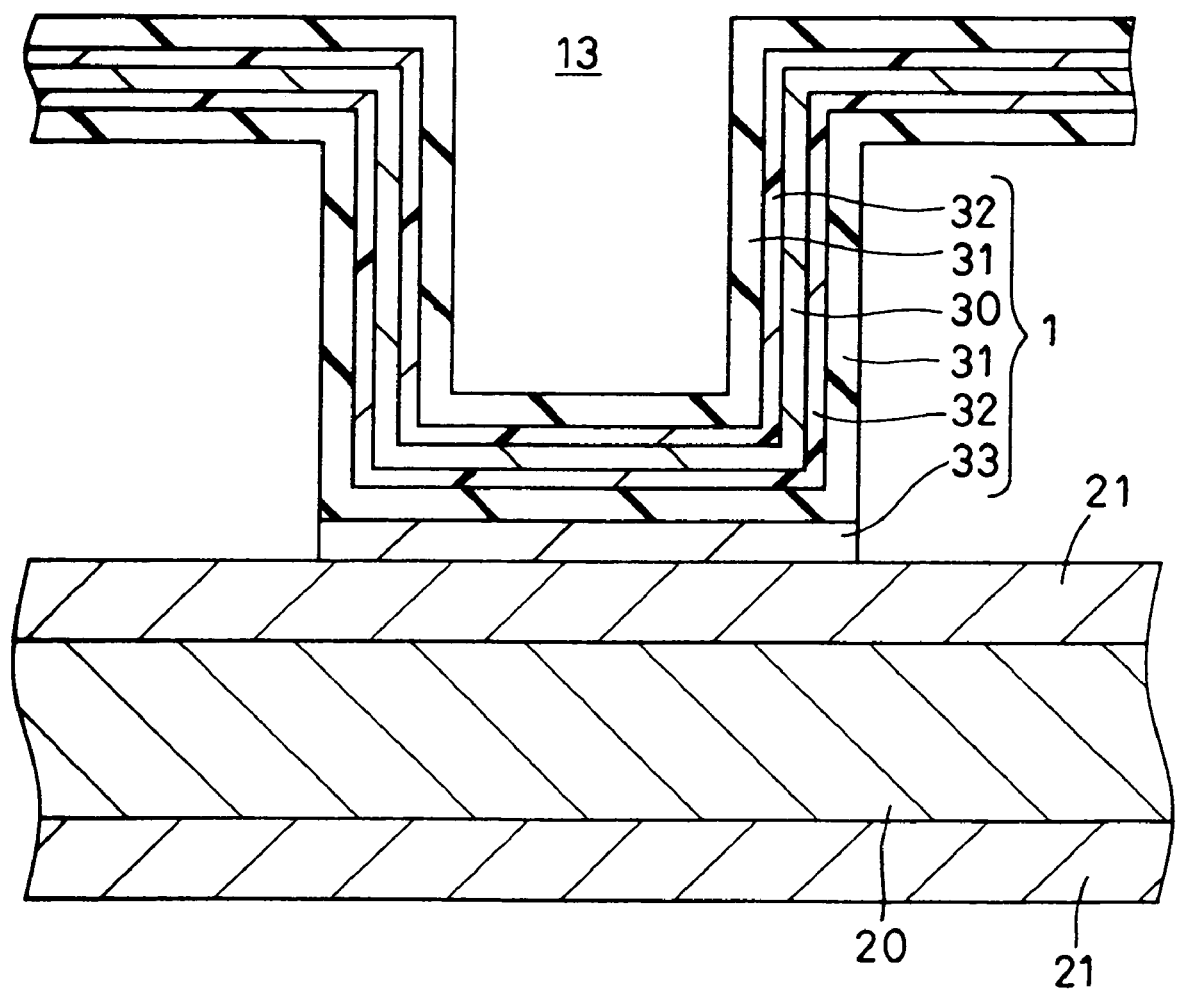
FIG. 14 is an enlarged view of a seventh embodiment, illustrating the main portion of the separating section 13.

FIG. 14 is an enlarged view of a seventh embodiment, illustrating the main portion of the separating section 13. In the seventh embodiment, the separator 1 is composed of a metal thin sheet 30, a coating layer 31, an adherent layer 32, and a high conductive layer 33. The high conductive layer 33 is formed in a region of the coating layer 31 which makes contact with the catalytic electrode 21. The high conductive layer 33 is higher in electrical conductivity than the coating layer 31.

In a case where the rate of power collection is lower than desired because of a high contact resistance between the coating layer 31 and the catalytic electrode 21, by forming the high conductive layer 33 in the region of the coating layer 31 which makes contact with the catalytic electrode 21, it is possible to reduce the contact resistance and thereby increase the power collection rate. The high conductive layer 33 should preferably be made of reactive elastomer added with nanocarbon.

Figure 15:
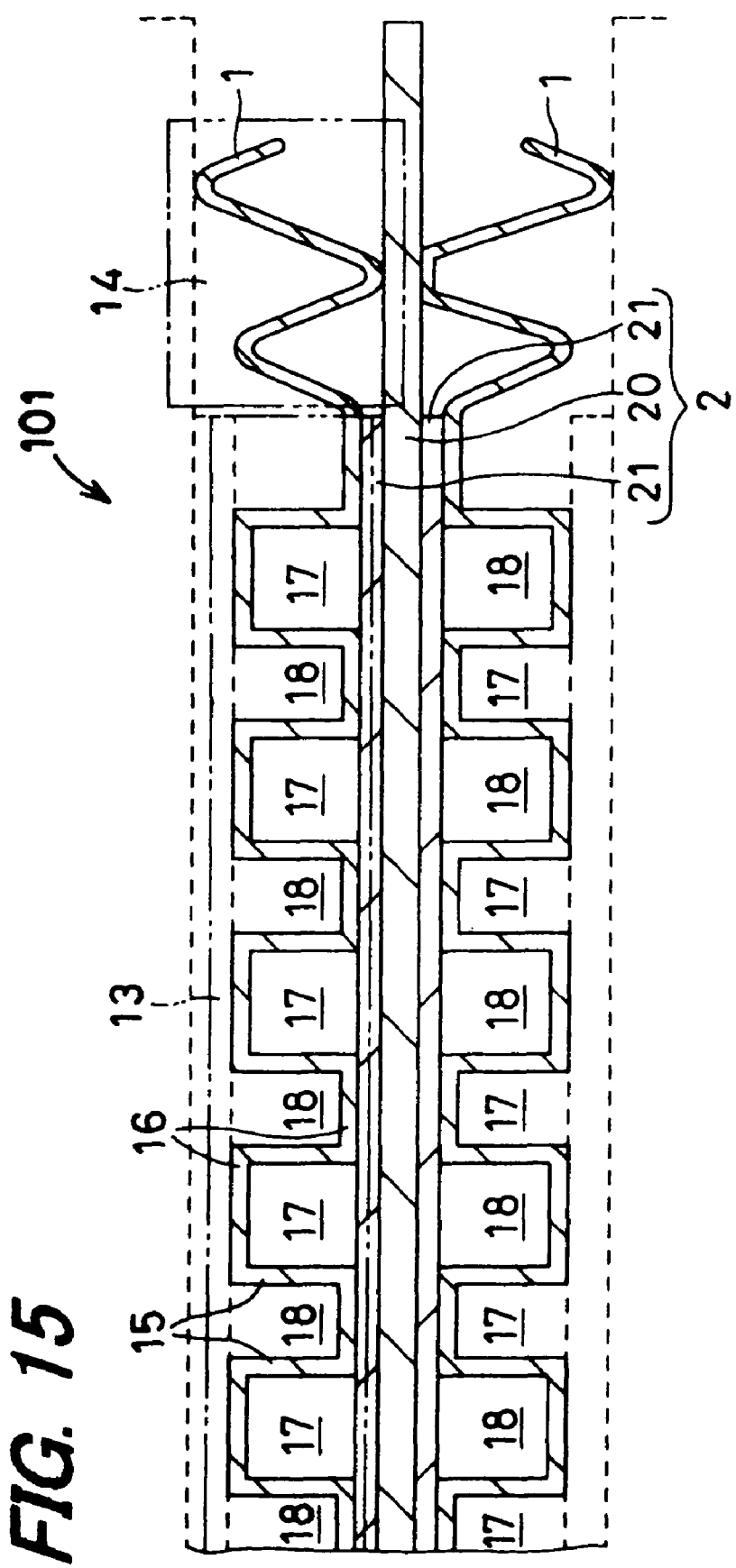
FIG. 15 is a horizontal sectional view of the unit cell 101 including the separator 1 in accordance with another embodiment of the invention.
Figure 16:
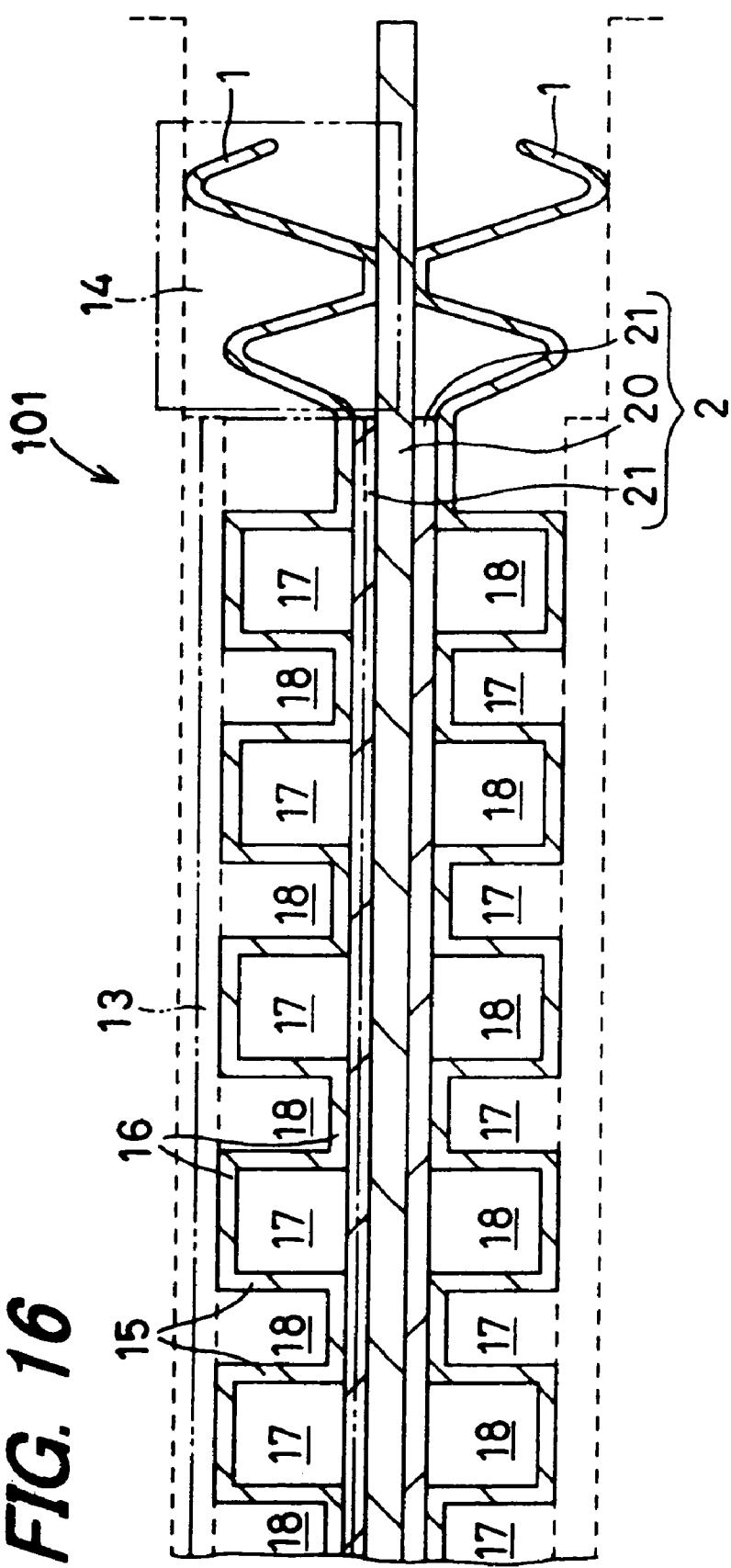
FIG. 16 is a horizontal sectional view of the unit cell 101 including the separator 1 in accordance with still another embodiment of the invention.

FIG. 15 is a horizontal sectional view of the unit cell 101 including the separator 1 in accordance with another embodiment of the invention. As shown in the figure, one of the separators 1 constituting the unit cell 101 may be provided with a sealing projection having a trapezoidal sectional profile so as to make surface-contact with the high polymer membrane 20. Alternatively, as shown in FIG. 16, both of the separators 1 constituting the unit cell 101 may be provided with a sealing projection having a trapezoidal sectional profile so as to make surface-contact with the high polymer membrane 20.

Figure 17:
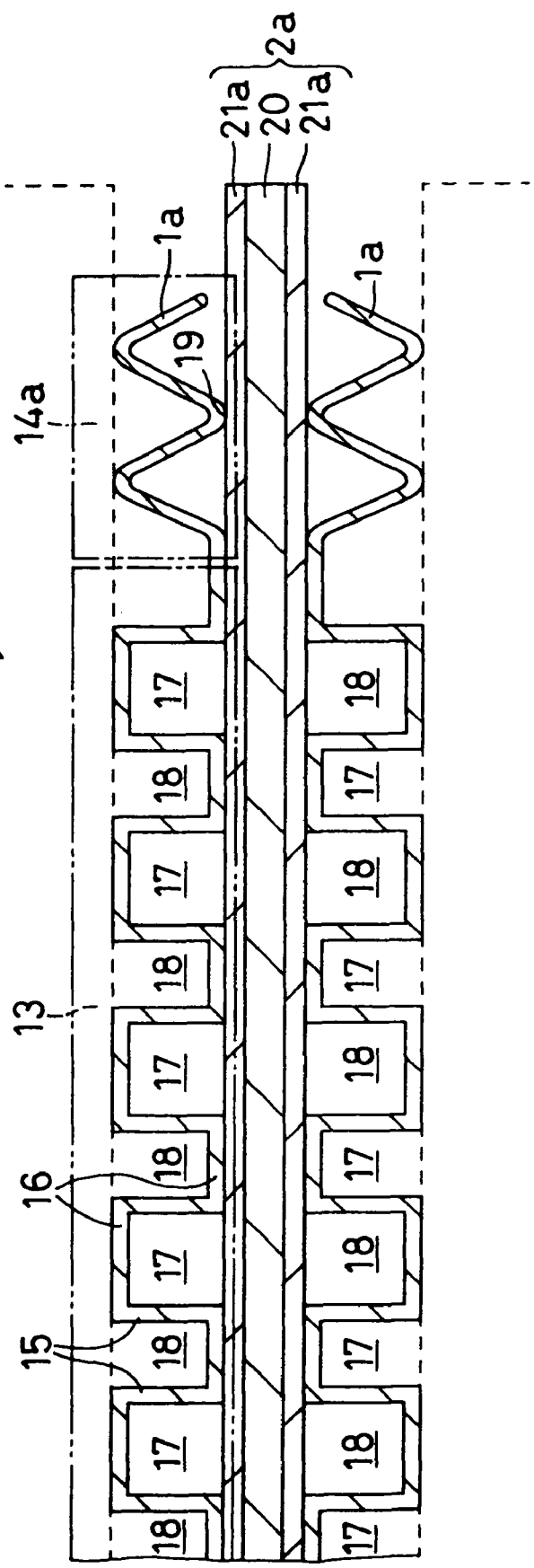
FIG. 17 is a horizontal sectional view of a unit cell 102 including a separator 1*a*.

FIG. 17 is a horizontal sectional view of a unit cell 102 including a separator 1a. In the description as to the unitary cell 102, the components that play the same or corresponding roles as in the unit cell 101 shown in FIG. 2 will be identified with the same reference symbols, and overlapping descriptions will be omitted. Therefore, only the different configurations of the unit cell 102 than in the unit cell 101 will be explained hereinbelow. The separator 1a is composed of a separating section 13 and a sealing section 14a. A fuel cell 2a is composed of a high polymer membrane 20 and a catalytic electrode 21a. The catalytic electrode 21a is, in contrast to the embodiments thus far described, so formed as to cover the entire surface of the high polymer membrane 20. Accordingly, in the sealing section 14a, the vertex 19 of the sealing projection is brought into pressure-contact with the catalytic electrode 21a instead of the high polymer membrane 20. In order to bring the vertex 19 of the sealing projection into pressure-contact with the catalytic electrode 21a successfully under a resilient force, the sealing section 14a is formed in a manner such that, when the separator 1 is kept out of contact with the catalytic electrode 21, namely when the PEFC 1 is in its yet-to-be assembled condition, the vertex 19 of the sealing projection extends beyond a virtual surface A of contact with the catalytic electrode 21. That is, in the present embodiment, the sealing section 14a is designed under the condition that the value t1 indicated in FIG. 3 is given as 0. Therefore, just as in the case of the preceding embodiment, by making changes to the value t2 at the time of press working, it is possible to adjust the sealing pressure with ease.

Figure 18:
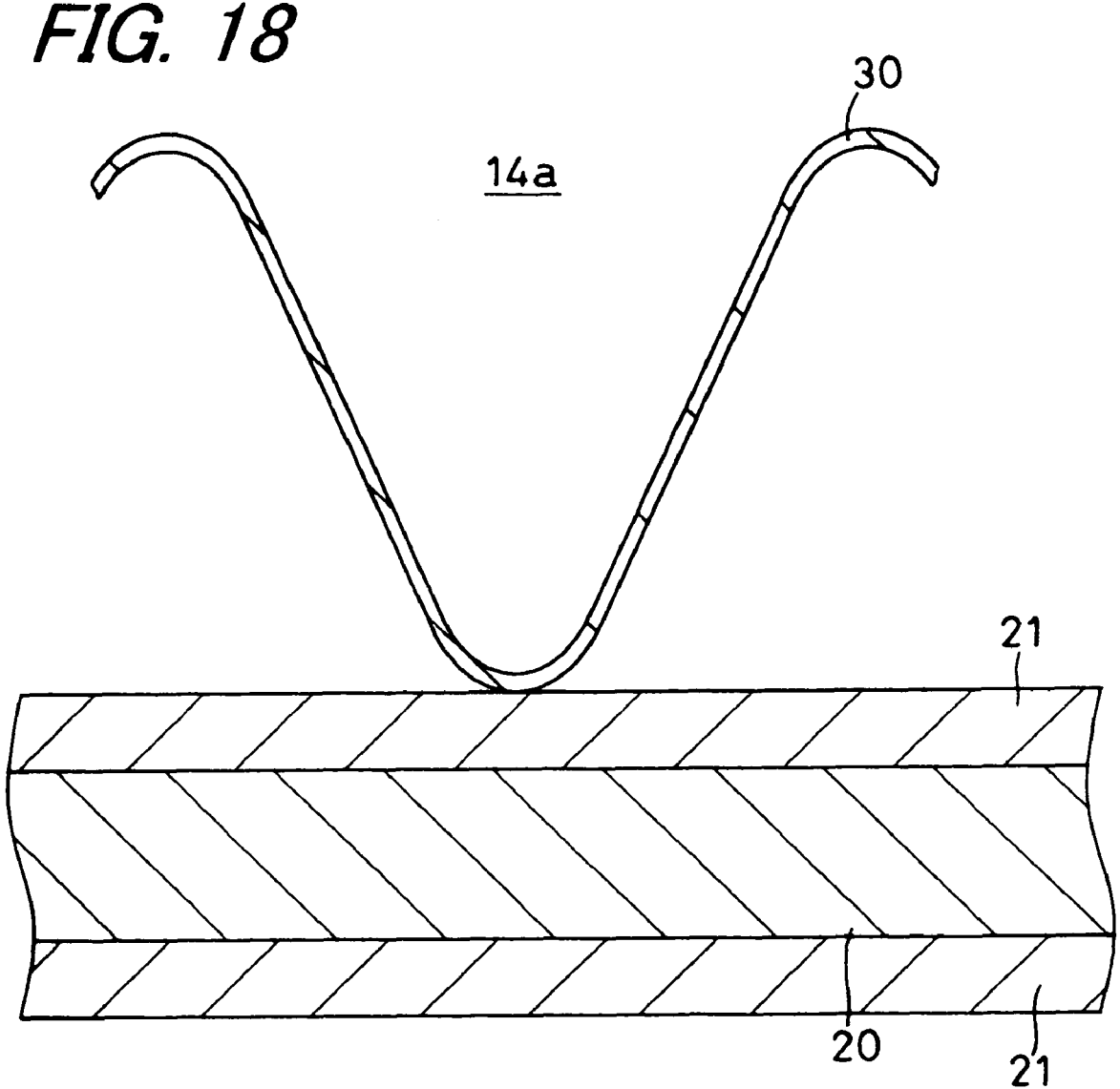
FIG. 18 is an enlarged view of an eighth embodiment, illustrating the main portion of a sealing section 14*a*.

FIG. 18 is an enlarged view of an eighth embodiment, illustrating the main portion of the sealing section 14a. In the eighth embodiment, the separator 1a is composed of a metal thin sheet 30. In the sealing section 14a, the metal thin sheet 30 makes contact with the catalytic electrode 21 to effect sealing.

Figure 19:
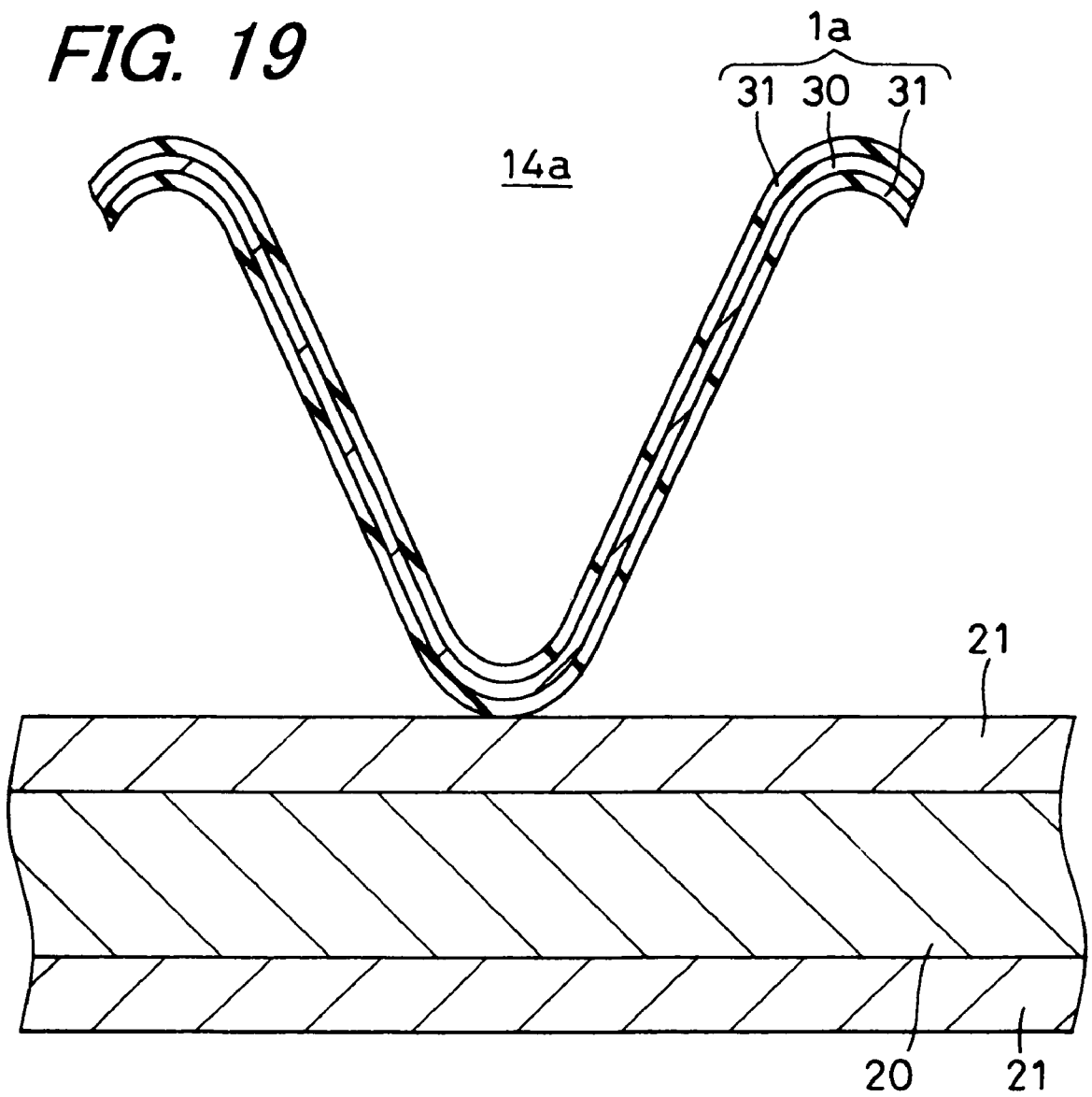
FIG. 19 is an enlarged view of a ninth embodiment, illustrating the main portion of the sealing section 14*a*.

FIG. 19 is an enlarged view of a ninth embodiment, illustrating the main portion of the sealing section 14a. In the ninth embodiment, the separator 1a, is composed of a metal thin sheet 30 and a coating layer 31. The coating layer 31 is so formed as to cover the surface of the metal thin sheet 30. In the sealing section 14a, the coating layer 31 makes contact with the catalytic electrode 21 to effect sealing. The coating layer 31 may be made of a material similar to that used in the third embodiment.

Figure 20:
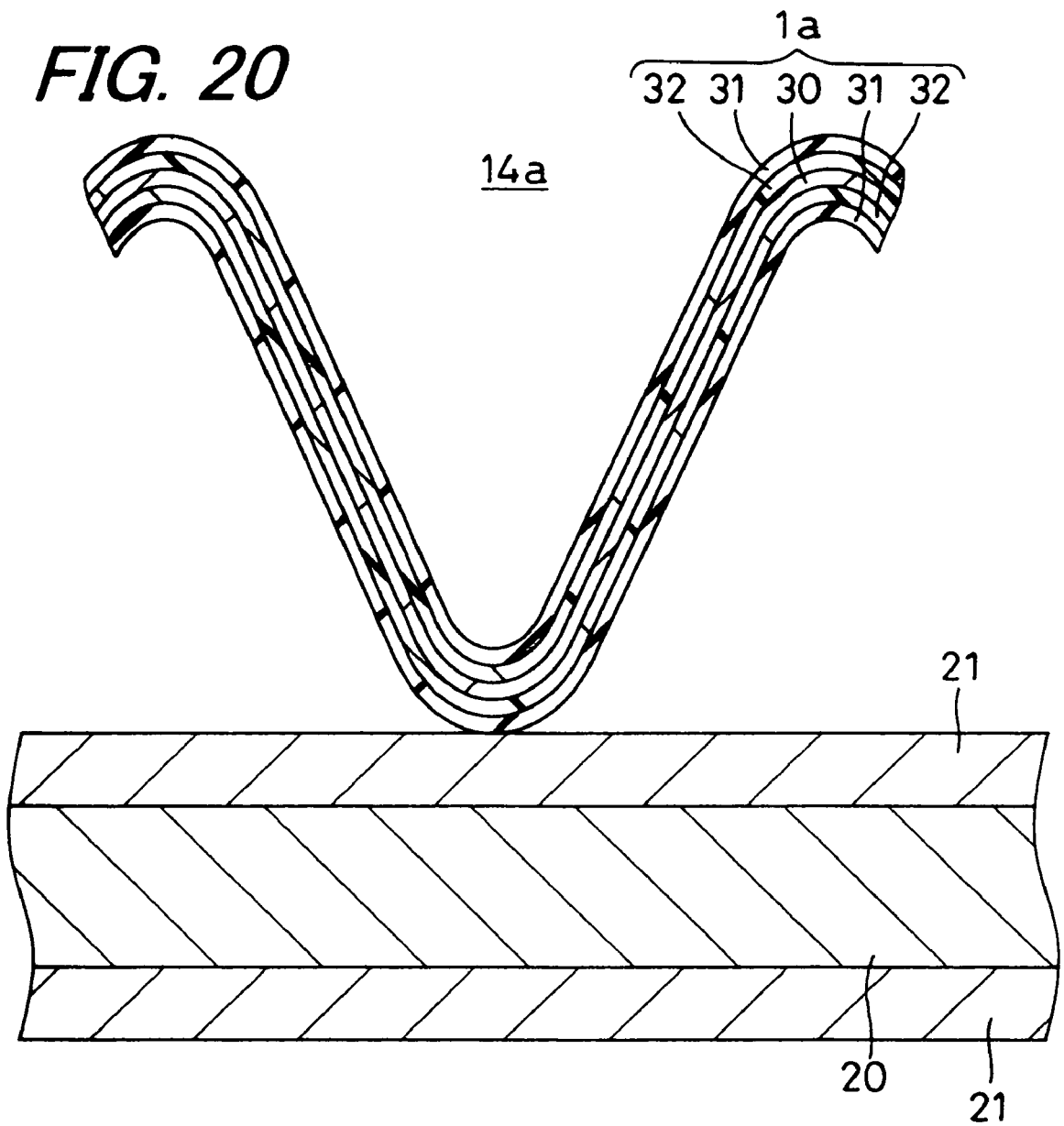
FIG. 20 is an enlarged view of a tenth embodiment, illustrating the main portion of the sealing section 14*a*.

FIG. 20 is an enlarged view of a tenth embodiment, illustrating the main portion of the sealing section 14a. In the tenth embodiment, the separator 1 is composed of a metal thin sheet 30, a coating layer 31, and an adherent layer 32. The coating layer 31 is so formed as to cover the surface of the metal thin sheet 30, with the adherent layer 32 lying therebetween. In the sealing section 14, the coating layer 31 makes contact with the catalytic electrode 21 to effect sealing. The coating layer 31 may be made of a material similar to that used in the third embodiment, and the adherent layer 32 may be made of a material similar to that used in the fifth embodiment.

Figure 21:
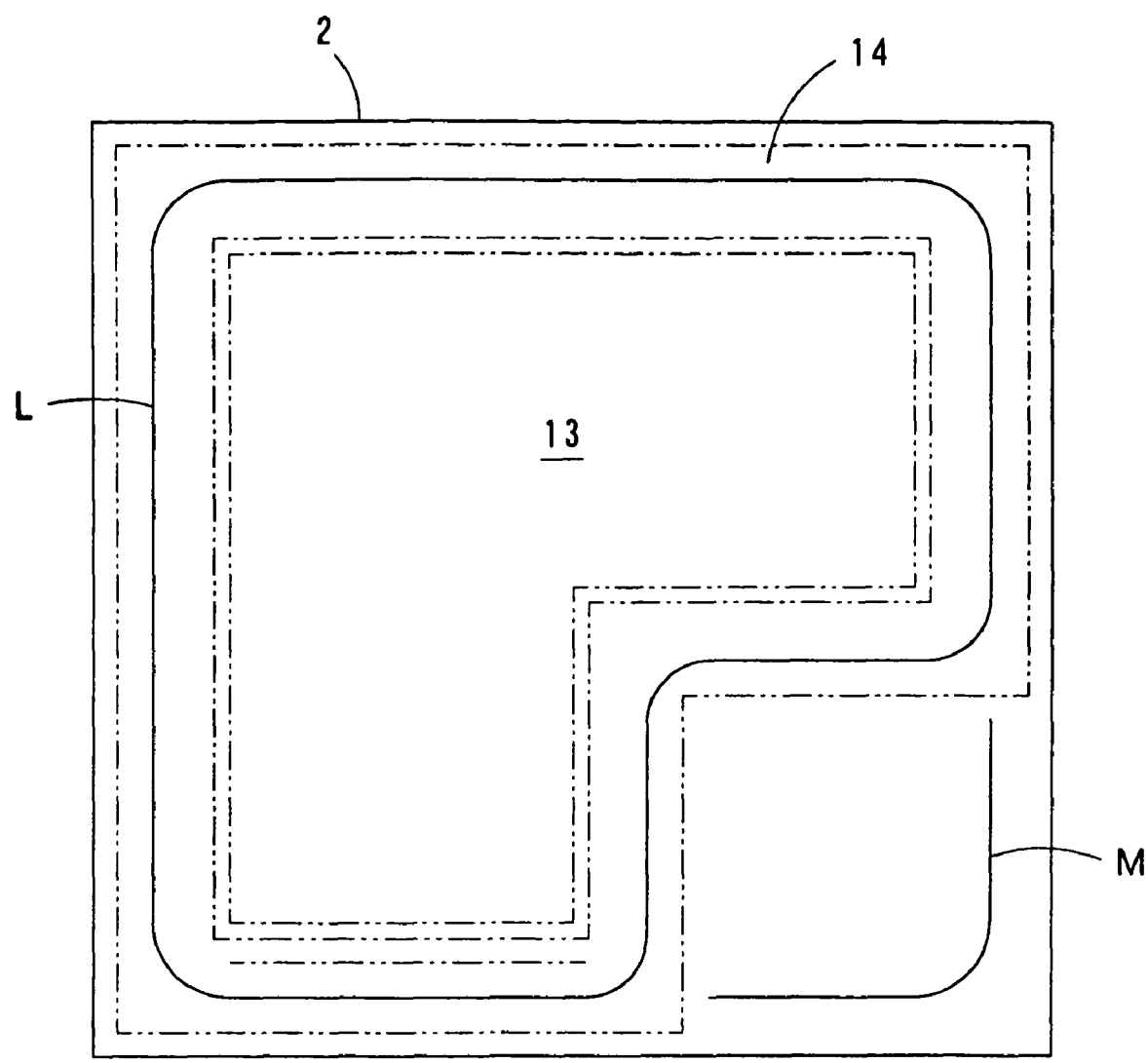
FIG. 21 is a schematic view showing the unit cell 101 as seen from a side.

FIG. 21 is a schematic view showing the unit cell 101 as seen from a side. The separating section 13 is not always formed so as to cover the entire surface of the fuel cell 2 and thus, as shown in FIG. 21, there may be a case where the seal line L is kept in an unbalanced state. This gives rise to lack of uniformity in the distribution of contact pressure which occurs between the separator 1 and the fuel cell 2 at the time of assembly, in consequence whereof there results improper contact at the separating section 13. In order to prevent this, in a region other than the sealing section 14 is disposed another projection analogous to the sealing projection (auxiliary projection). As shown in the figure, the location where the auxiliary projection is abutted against the high polymer membrane 20 is indicated by an abutment line M. By forming the auxiliary projection in a manner such that the abutment line M and the seal line L are distributed evenly within the fuel cell 2 surface, it is possible to make the contact pressure distribution uniform.

Next, a description will be given below as to a method for manufacturing the separator 1. As for the first and eighth embodiments, the separator 1 is composed of the metal thin sheet 30, and thus the separating section 13 and the sealing section 14 are formed integrally with each other by means of press working. Specifically, the sealing projection is formed by performing beading process on the outer periphery of the metal thin sheet 30, and the channel is formed by performing embossing process on the midportion thereof.

As for the third, fifth, ninth, and tenth embodiments, the separator 1 can generally be constituted by the following two manufacturing methods. According to the first method, at the outset the metal thin sheet 30 is subjected to press working to form the separating section 13 and the sealing section 14 in a single-piece construction. Specifically, the sealing projection is formed by performing beading process on the outer periphery of the metal thin sheet 30, and the channel is formed by performing embossing process on the midportion thereof. Subsequently, a rubber coating is applied to form the coating layer 31. According to the second method, a platy thin metal is coated with a rubber material, followed by performing press working thereon.

As for the seventh embodiment, just as in the case of the third, fifth, ninth, and tenth embodiments, in the metal thin sheet in a rubber-coated state, a coating is selectively applied only to the region to be contacted by the catalytic electrode 21 by means of a spray technique, a transference technique, a screen printing technique, a stencil printing technique, etc.

In the embodiments thus far described, in addition, heating treatment is carried out at a temperature of 130° C. or above to cure the metal thin sheet 30 while cross-linking the rubber material.

As for the second, fourth, and sixth embodiments, the separator is constituted in accordance with the following process steps.

(1) Step for Processing a Metal Thin Sheet

A sheet-like metal thin sheet is subjected to predetermined treatment to attain sufficient adherability with rubber, for example the surface roughing treatment (refer to the fourth embodiment) and the adherent-layer formation process (refer to the sixth embodiment).

(2) Step for Stamping

The surface-treated metal thin sheet is subjected to die stamping to obtain a predetermined configuration and gas flow paths.

(3) Step for Forming a Coating Layer

The stamped metal thin sheet has its surface coated with liquid-type conductive rubber containing electrically conductive carbon filler, or has its surface laminated with green sheet-like conductive rubber. For example, polyisobutylene rubber can be used as the liquid-type conductive rubber. Note that this process step is not included in the course of manufacture of the second embodiment, because it has no coating layer.

(4) Step for Forming a High Polymer Elastic Layer

A high polymer elastic layer is formed in a region of the metal thin sheet or the coating layer which is formed into the vertex of the sealing projection. Specifically, the high polymer elastic layer is formed by the following two methods: using a solution prepared by dissolving a rubber or synthetic resin material in a solvent; and using a reactive solution containing monomer, oligomer formed into a rubber or synthetic resin material.

Moreover, such a solution or reactive solution may be applied to a predetermined region by means of screen printing, gravure printing, stencil printing, or the like technique.

(5) Step for Press Working

Press working is carried out to form the channels of the separating section 13 and the sealing projection of the sealing section 14. The separating section 13 and the sealing section 14 can be formed at one time during the press working.

(6) Step for Vulcanization Treatment

The high polymer elastic layer and the coating layer are vulcanized through application of heat. Note that the BH (Baked Hardening) treatment on the metal thin sheet and the cross-linking treatment on the rubber layer can be conducted at the same time by performing heating in the course of the press working. By subjecting the metal thin sheet to the BH treatment, it is possible to attain higher heat resistance, as well as to retard stress alleviation in the sealing section 14, and thereby maintain satisfactory sealability.

A predetermined number of the separators 1 and the fuel cells 2 thus constructed are arranged in an alternating manner. Then, the power collector plate 3 and the insulating sheet 4 are disposed externally of the arrangement. Lastly, the end flanges 5 are disposed so as to have sandwiched therebetween all of the components firmly, thus realizing the PEFC 100.

The separators of the second, fourth, and sixth embodiments were actually produced as implementation examples under the following conditions.

The implementation examples shared a common metal thin sheet. The metal thin sheet is formed of a SUS 304-made thin sheet which is 10 cm in length, 10 cm in width, and 0.2 mm in thickness. The surface of the metal thin sheet was roughed up by sand blast process. The metal thin sheet was then subjected to press working to form a sealing projection along its outer periphery, as well as to form separation channels in its midportion.

EXAMPLE 1

A one-component thermosetting olefin-base sealing material (Threebond 1152 (tradename) manufactured by Three Bond Co., Ltd.) is printed in apart of the metal thin sheet which is formed into the vertex of the sealing projection by means of screen printing, and is then heated to cure for 40 minutes at a temperature of 120° C. In this way, a 25 to 30 µm-thick high polymer elastic layer is formed. Upon the completion of the heat hardening treatment, the sealing projection is formed by means of press working.

EXAMPLE 2

The sealing projection is formed in advance by means of press working. Then, a sealing material prepared by admixing chlorosulfonic polyethylene, an inorganic filler, and a solvent (Threebond 1104 (tradename) manufactured by Three Bond Co., Ltd.) is printed onto the vertex of the sealing projection, followed by performing heat hardening treatment thereon. In this way, a 15 to 20 µm-thick high polymer elastic layer is formed.

EXAMPLE 3

The sealing projection is formed in advance by means of press working. Then, as a photosetting adhesive, silicon PSA is ejected onto the vertex of the sealing projection through a needle-shaped nozzle, followed by performing light irradiation thereon as hardening treatment. In this way, a 15 to 20 µm-thick high polymer elastic layer is formed.

EXAMPLE 4

The surface of the SUS 304-made thin sheet is roughed up by sand blast process, and is then subjected to primer treatment using polyaniline. Subsequently, an admixture of addition-polymerized allyl-series polyisobutylene and electrically conductive carbon graphite is applied thereto in a thickness of 50 µm, followed by performing heat hardening treatment thereon for two hours at a temperature of 130° C., whereby a coating layer is formed. After that, just as in the case of Implementation example 1, a one-component thermosetting olefin-base sealing material (Threebond 1152 (tradename) manufactured by Three Bond Co., Ltd.) is printed in a part of the coating layer which is formed into the vertex of the sealing projection by means of screen printing, and is then heated to cure for 40 minutes at a temperature of 120° C. In this way, a 25 to 30 µm-thick high polymer elastic layer is formed. Upon the completion of the heat hardening treatment, the sealing projection is formed by means of press working.

EXAMPLE 5

The surface of the SUS 304-made thin sheet is roughed up by sand blast process, and is then subjected to primer treatment using polyaniline. Subsequently, an admixture of addition-polymerized allyl-series polyisobutylene and electrically conductive carbon graphite is applied thereto in a thickness of 50 µm, followed by performing heat hardening treatment thereon for two hours at a temperature of 130° C., whereby a coating layer is formed. After the sealing projection is formed by means of press working, a sealing material prepared by admixing chlorosulfonic polyethylene, an inorganic filler, and a solvent (Threebond 1104 (tradename) manufactured by Three Bond Co., Ltd.) is printed onto the vertex of the sealing projection, followed by performing heat hardening treatment thereon. In this way, a 15 to 20 µm-thick high polymer elastic layer is formed.

COMPARATIVE EXAMPLE

Channels are formed in the SUS 304-made thin sheet by means of press working. Instead of forming the sealing projection, a 1 mm-thick polyisobutylene-base flat sheet gasket is disposed in the region corresponding to the outer periphery of the SUS 304-made thin sheet where the sealing projection is formed as in the implementation examples.

A sealing test was conducted on each of Examples 1 through 5 and Comparative example. Specifically, a stack of four pieces of the separators is held by a 10 mm-thick steel sheet, with use of a bolt, in such a way as to fasten the adjoining separators to each other in the direction of stacking the separators. Then, air is blown into the inlet hole drilled in the separating section to check presence or absence of air leakage.

All of Examples 1 through 5 showed no signs of air leakage and exhibited excellent sealing capability. By way of contrast, air leakage was observed in Comparative example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described heretofore, according to the invention, it is no longer necessary to prepare a sealing member such as an O-ring or a gasket that has conventionally been required to effect sealing. Therefore, the number of constituent components of a fuel cell can be reduced successfully.

According to the invention, since the separating section and the sealing section are formed integrally with each other, the number of manufacturing process steps can be reduced successfully.

According to the invention, being made of a metal sheet, it is possible to perform plastic deformation processing with ease.

According to the invention, in performing plastic deformation processing on the separator, all that needs to be done is simply to create channels and a sealing projection.

According to the invention, the sealing projection has, at least in its area to be contacted by an electrolyte layer, a high polymer elastic layer formed of an elastic body. This helps improve the sealability even further.

According to the invention, the high polymer elastic layer, although it is formed in a limited space, makes it possible to attain sufficiently high sealability.

According to the invention, it is possible to avoid any inconvenience such as improper contact which occurs between the separator and an electrolyte assembly due to for example tilting of the separator in the course of assembly.

According to the invention, the metal sheet has its surface coated with a rubber- or synthetic resin-made layer. The use of such a metal sheet makes it possible to produce a separator which is excellent in workability and corrosion resistance.

According to the invention, the coating layer exhibits electrical conductivity, wherefore the DC power generated in the electrolyte assembly can be taken out and collected by way of the separator.

According to the invention, it is possible to reduce the contact resistance between the separator and the electrolyte assembly.

The invention claimed is:
1. A fuel-cell separator which is interposed between adjacent ones of a plurality of electrolyte assemblies, each constructed of an electrolyte layer containing an electrolyte medium sandwiched between two catalytic electrodes that are disposed on respective surfaces in a thickness-wise direction of the electrolyte layer, the fuel-cell separator comprising:
- a separating section for achieving separation between a fuel gas channel and an oxidizer gas channel; and
- a sealing section disposed along an outer periphery of the separator, for preventing leakage of fuel gas and oxidizer gas, the separating section and the sealing section being integrally formed with each other,
- wherein a region corresponding to the sealing section is provided with a sealing projection which extends in parallel with the surface of the electrolyte assembly on which the catalytic electrode is formed, a vertex of which is brought into pressure-contact with the electrolyte assembly under a resilient force,
- a sectional profile of the sealing projection perpendicular to a direction in which fuel gas and oxidizer gas flow is U-shaped or V-shaped,
- the sealing section is formed in a manner such that, when the fuel cell is in a yet-to-be assembled condition, the vertex of the sealing projection extends beyond a position of contact with the electrolyte assembly in contrast to a case where the fuel cell is in an assembled condition,
- wherein the sealing projection has, at least in its area to be contacted by the electrolyte layer, a high polymer elastic layer formed of an elastic body, and
- wherein the high polymer elastic layer has a width ranging from 1 to 10 mm and a thickness ranging from 1 to 100 μm.

2. The fuel-cell separator of claim 1, wherein the separating section and the sealing section are formed integrally with each other by way of plastic deformation processing.

3. The fuel-cell separator of claim 1, wherein the fuel-cell separator is constituted by a metal sheet.

4. The fuel-cell separator of claim 1, wherein the separating section has a plurality of parallelly arranged U-shaped channels positioned in parallel with the surface of the electrolyte assembly on which the catalytic electrode is formed.

5. The fuel-cell separator of any claim 1, wherein the separating section and the sealing section are formed by way of press working.

6. The fuel-cell separator of claim 1, wherein two or more pieces of the sealing projections are provided, with their vertices abutted against the electrolyte layer, and wherein, given that the location of abutment between the vertex and the electrolyte layer is imaginarily indicated by an abutment line, the two or more abutment lines are arranged in parallel with each other.

7. The fuel-cell separator of claim 1, further comprising an auxiliary projection analogous to the sealing projection formed in the region other than the sealing section and the separating section,
- wherein the auxiliary projection is disposed in such a way as to make uniform the distribution of contact pressure which occurs between the separator and the electrolyte assembly at the time of assembly of the fuel cell including the separator.

8. The fuel-cell separator of claim 1, wherein the separating section is formed of a metal sheet, and the metal sheet has its surface coated with a rubber- or synthetic resin-made coating layer.

9. The fuel-cell separator of claim 8, wherein the coating layer exhibits electrical conductivity.

10. The fuel-cell separator of claim 8, wherein the coating layer is so formed as to cover the surface of the metal sheet, with an adherent layer or a surface-treated layer lying therebetween.

11. The fuel-cell separator of claim 9, wherein in a region of the coating layer which makes contact with the electrolyte assembly is formed a high conductive layer that is higher in electrical conductivity than the coating layer.

12. The fuel-cell separator of claim 9, wherein the coating layer is so formed as to cover the surface of the metal sheet, with an adherent layer or a surface-treated layer lying therebetween.

13. The fuel-cell separator of claim 8, wherein in a region of the coating layer which makes contact with the electrolyte assembly is formed a high conductive layer that is higher in electrical conductivity than the coating layer.

14. The fuel-cell separator of claim 10, wherein in a region of the coating layer which makes contact with the electrolyte assembly is formed a high conductive layer that is higher in electrical conductivity than the coating layer.

* * * * *